United States Patent
Suzuki et al.

(10) Patent No.: US 9,778,854 B2
(45) Date of Patent: Oct. 3, 2017

(54) COMPUTER SYSTEM AND METHOD FOR CONTROLLING HIERARCHICAL STORAGE THEREFOR

(71) Applicant: Hitachi, Ltd., Tokyo (JP)

(72) Inventors: Katsunori Suzuki, Tokyo (JP); Hironori Emaru, Tokyo (JP); Yukinori Sakashita, Tokyo (JP); Satoshi Kaneko, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/787,905

(22) PCT Filed: Jan. 15, 2014

(86) PCT No.: PCT/JP2014/050514
§ 371 (c)(1),
(2) Date: Oct. 29, 2015

(87) PCT Pub. No.: WO2015/107626
PCT Pub. Date: Jul. 23, 2015

(65) Prior Publication Data
US 2016/0110117 A1   Apr. 21, 2016

(51) Int. Cl.
*G06F 12/10* (2016.01)
*G06F 3/06* (2006.01)
*G06F 9/455* (2006.01)

(52) U.S. Cl.
CPC .......... *G06F 3/0611* (2013.01); *G06F 3/0647* (2013.01); *G06F 3/0649* (2013.01);
(Continued)

(58) Field of Classification Search
CPC ......... G06F 2009/45579; G06F 3/0611; G06F 3/0647; G06F 3/0649; G06F 3/0683; G06F 3/0685; G06F 9/45558
See application file for complete search history.

(56) References Cited

U.S. PATENT DOCUMENTS

2006/0047929 A1   3/2006   Otani et al.
2006/0143211 A1   6/2006   Hara
(Continued)

FOREIGN PATENT DOCUMENTS

JP   2005-071068 A   3/2005
JP   2006-072684 A   3/2006
(Continued)

OTHER PUBLICATIONS

International Search Report and Written Opinion of the International Searching Authority of the PCT/JP2014/050514.

*Primary Examiner* — Yong Choe
(74) *Attorney, Agent, or Firm* — Mattingly & Malur, PC

(57) ABSTRACT

A method for controlling hierarchical storage including: a first step for storing first information relating to the association between the specific processes and the storage regions of the storage tiers; a second step for obtaining second information relating to the access operations of the specific processes as a function of time; a third step for obtaining third information relating to the amount of access to the storage regions as a function of time; and a fourth step for identifying the time of occurrence of a change in the amount of access, from the second information and the third information on the basis of the first information, and determining, according to the identified time of occurrence of the change in the amount of access, a transfer initiation time at which data in the storage regions is to be transferred between storage tiers.

11 Claims, 26 Drawing Sheets

(52) U.S. Cl.
CPC .......... *G06F 3/0683* (2013.01); *G06F 3/0685* (2013.01); *G06F 9/45558* (2013.01); *G06F 2009/45579* (2013.01)

(56) References Cited

U.S. PATENT DOCUMENTS

| | | |
|---|---|---|
| 2006/0242112 A1 | 10/2006 | Hikita |
| 2009/0300285 A1 | 12/2009 | Nagai et al. |
| 2011/0231631 A1 | 9/2011 | Matsuzawa et al. |
| 2012/0185426 A1 | 7/2012 | Mori et al. |
| 2013/0124780 A1 | 5/2013 | Baderdinni et al. |

FOREIGN PATENT DOCUMENTS

| | | |
|---|---|---|
| JP | 2006-164167 A | 6/2006 |
| JP | 2006-301892 A | 11/2006 |
| JP | 2011-192259 A | 9/2011 |
| JP | 2013-105489 A | 5/2013 |
| JP | 2013-171474 A | 9/2013 |

F I G. 4
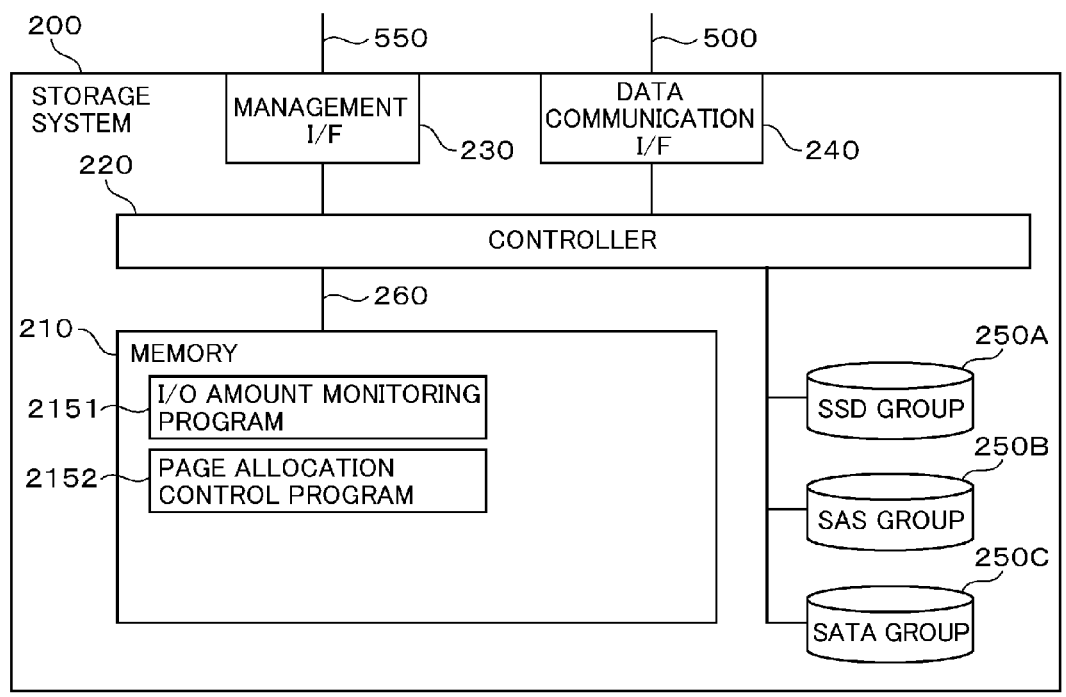

FIG. 6

| APPLICATION NAME | OPERATION TYPE | SERVER NAME | SUBPROGRAM | DATA ID | PAGE NO. |
|---|---|---|---|---|---|
| MAIL SERVER | ACTIVATION | SERVER1 | DB PROGRAM ACTIVATION | data_aa, data_bb | PAGE 100, PAGE 200 |
| 110101 | 110102 | 110103 | 110104 | 110105 | 110106 |

SUBPROGRAM PAGE RELATIONSHIP TABLE 1101

F I G. 7

EVENT ANALYSIS TABLE 1102

| APPLICATION NAME | OPERATION TYPE | SERVER NAME | SUBPROGRAM | SUBPROGRAM GENERATION TIMING | I/O ANALYSIS DATA ID |
|---|---|---|---|---|---|
| MAIL SERVER | ACTIVATION | SERVER1 | DB PROGRAM ACTIVATION | 60 sec | 1 |
| | | | MAIL DELIVERY PROGRAM ACTIVATION | 180 sec | 2 |
| | | | USER PROCESSING TO CHECK ACTIVATION STATE INITIATED | 300 sec | 3 |
| | | | MAIL DELIVERY PROCESSING INITIATED | 600 sec | 4 |

110201 110202 110203 110204 110205 110206

F I G. 8

I/O ANALYSIS DATA 1103

| I/O ANALYSIS DATA ID | ELAPSED TIME | PAGE NO. | AVERAGE IOPS | DESIGNATED Tier |
|---|---|---|---|---|
| 1 | 0 – 59sec | 100 | 100 | Tier1 |
|  |  | 200 | 180 | Tier1 |
|  |  | 250 | 50 | – |
|  | 60 – 119sec | 100 | 10 | – |
|  |  | 200 | 250 | Tier1 |
|  |  | 250 | 80 | – |
| ... |  |  |  | ... |

110301　110302　110303　110304　110305

F I G. 9

| JOB MANAGEMENT TABLE | | | | | 1104 |
|---|---|---|---|---|---|
| JOB ID | EXECUTION TIME | APPLICATION NAME | OPERATION TYPE | SERVER NAME | |
| 1 | 2013/10/15 8:00 | MAIL SERVER | ACTIVATION | SERVER1 | |
| 110401 | 110402 | 110403 | 110404 | 110405 | |

FIG. 10

PAGE HIERARCHICAL CONTROL TASK MANAGEMENT TABLE 1105

| HIERARCHICAL CONTROL TASK ID | EXECUTION TIME | SCHEDULED COMPLETION TIME | COMPLETION TIME | PAGE ID | DESTINATION Tier | JOB ID |
|---|---|---|---|---|---|---|
| 1 | 2013/10/15 8:55 | 2013/10/15 9:00 | 2013/10/15 8:59 | PAGE 300 | Tier 2 | 1 |
| 2 | 2013/10/15 9:00 | 2013/10/15 9:03 | — | PAGE 100 | Tier 1 | 1 |
| 110501 | 110502 | 110503 | 110504 | 110505 | 110506 | 110507 |

F I G. 1 1

1201

| IOPS TRANSITION DATA | | | |
|---|---|---|---|
| IOPS TRANSITION DATA ID | TIME | PAGE NO. | IOPS |
| 1 | 2013/10/15 9:00 – 2013/10/15 9:01 | 100 | 10 |
| | | 101 | 10 |
| | | ... | ... |
| | 2013/10/15 9:01 – 2013/10/15 9:02 | 100 | 110 |
| | | 101 | 30 |
| | | ... | ... |
| | ... | ... | ... |
| | 2013/10/15 9:10 – 2013/10/15 9:11 | 100 | 20 |
| | | 101 | 20 |
| | | ... | ... |

120101  120102  120103  120104

F I G. 1 2

| LOG FILE DATA | | |
|---|---|---|
| LOG FILE ID | TIME | SUBPROGRAM |
| 1 | 2013/10/15 9:01 | DB PROGRAM ACTIVATED |
| | 2013/10/15 9:03 | DB PROGRAM ACTIVATION COMPLETED |
| | 2013/10/15 9:03 | MAIL DELIVERY PROGRAM ACTIVATED |
| | ... | ... |

120201  120202  120203

1202

F I G. 1 3

1203

| LOG FILE MANAGEMENT TABLE | | | | |
|---|---|---|---|---|
| APPLICATION NAME | OPERATION TYPE | SERVER NAME | EXECUTION TIME | LOG FILE ID |
| MAIL SERVER | ACTIVATION | SERVER1 | 2013/10/15 9:01 | 1 |
| MAIL SERVER | ACTIVATION | SERVER1 | 2013/10/5 10:00 | 2 |
| VM1 | ACTIVATION | SERVER1 | 2013/10/3 9:00 | 3 |

120301　120302　120303　120304　120305

F I G. 1 4

1204

| HIERARCHICAL STORAGE PERFORMANCE MANAGEMENT TABLE | | | |
|---|---|---|---|
| Tier ID | READ THROUGHPUT | WRITE THROUGHPUT | UPPER LIMIT IOPS |
| Tier1 | 200MB/s | 150MB/s | 100 |
| Tier2 | 100MB/s | 50MB/s | 50 |
| Tier3 | 50MB/s | 30MB/s | 30 |

LOG FILE 3201

| APPLICATION NAME | OPERATION TYPE | TIME | SUBPROGRAM |
|---|---|---|---|
| MAIL SERVER | ACTIVATION | 2013/10/15 9:00 | MAIL SERVER ACTIVATING OPERATION INITIATED |
| | | 2013/10/15 9:01 | DB PROGRAM ACTIVATED |
| | | 2013/10/15 9:03 | DB PROGRAM ACTIVATION COMPLETED |
| | | 2013/10/15 9:03 | MAIL DELIVERY PROGRAM ACTIVATED |
| | | 2013/10/15 9:04 | MAIL DELIVERY PROGRAM ACTIVATION COMPLETED |
| | | 2013/10/15 9:05 | USER PROCESSING TO CHECK ACTIVATION STATE ACCEPTED |
| | | 2013/10/15 9:05 | RESPONSE TO USER PROCESSING TO CHECK ACTIVATION STATE COMPLETED |
| | | 2013/10/15 9:10 | REQUEST FOR MAIL DISTRIBUTION FROM CLIENT A RECEIVED |
| | | 2013/10/15 9:11 | RESPONSE TO CLIENT A COMPLETED |

320101  320102  320103  320104

F I G. 1 6

1106

| PAGE HIERARCHICAL CONTROL MANAGEMENT TABLE | | | | |
|---|---|---|---|---|
| TIME | PAGE NO. | Tier ID | IOPS | DESIGNATED Tier |
| 2013/10/15 9:00 – 2013/10/15 9:01 | 100 | Tier1 | 100 | Tier1 |
| | 200 | Tier1 | 180 | Tier1 |
| | 250 | Tier3 | 50 | – |
| | ... | ... | ... | ... |
| 2013/10/15 9:01 – 2013/10/15 9:02 | 100 | Tier3 | 10 | – |
| | 200 | Tier1 | 250 | Tier1 |
| | 250 | Tier2 | 80 | – |
| | ... | ... | ... | ... |
| ... | ... | ... | ... | ... |

110601  110602  110603  110604  110605

F I G. 1 7

1107

| HIERARCHICAL STORAGE CAPACITY MANAGEMENT TABLE | | | | |
|---|---|---|---|---|
| TIME | Tier ID | OVERALL CAPACITY (GB) | UNOCCUPIED CAPACITY (GB) | FIXED CAPACITY (GB) |
| 2013/10/15 9:00 – 2013/10/15 9:01 | Tier1 | 100 | 20 | 50 |
| | Tier2 | 1,000 | 1,000 | 600 |
| | Tier3 | 10,000 | 3,000 | 0 |
| 2013/10/15 9:01 – 2013/10/15 9:02 | Tier1 | 100 | 0 | 90 |
| | Tier2 | 1,000 | 800 | 100 |
| | Tier3 | 10,000 | 5,000 | 0 |
| ... | ... | ... | ... | ... |

110701  110702  110703  110704  110705

F I G. 1 8
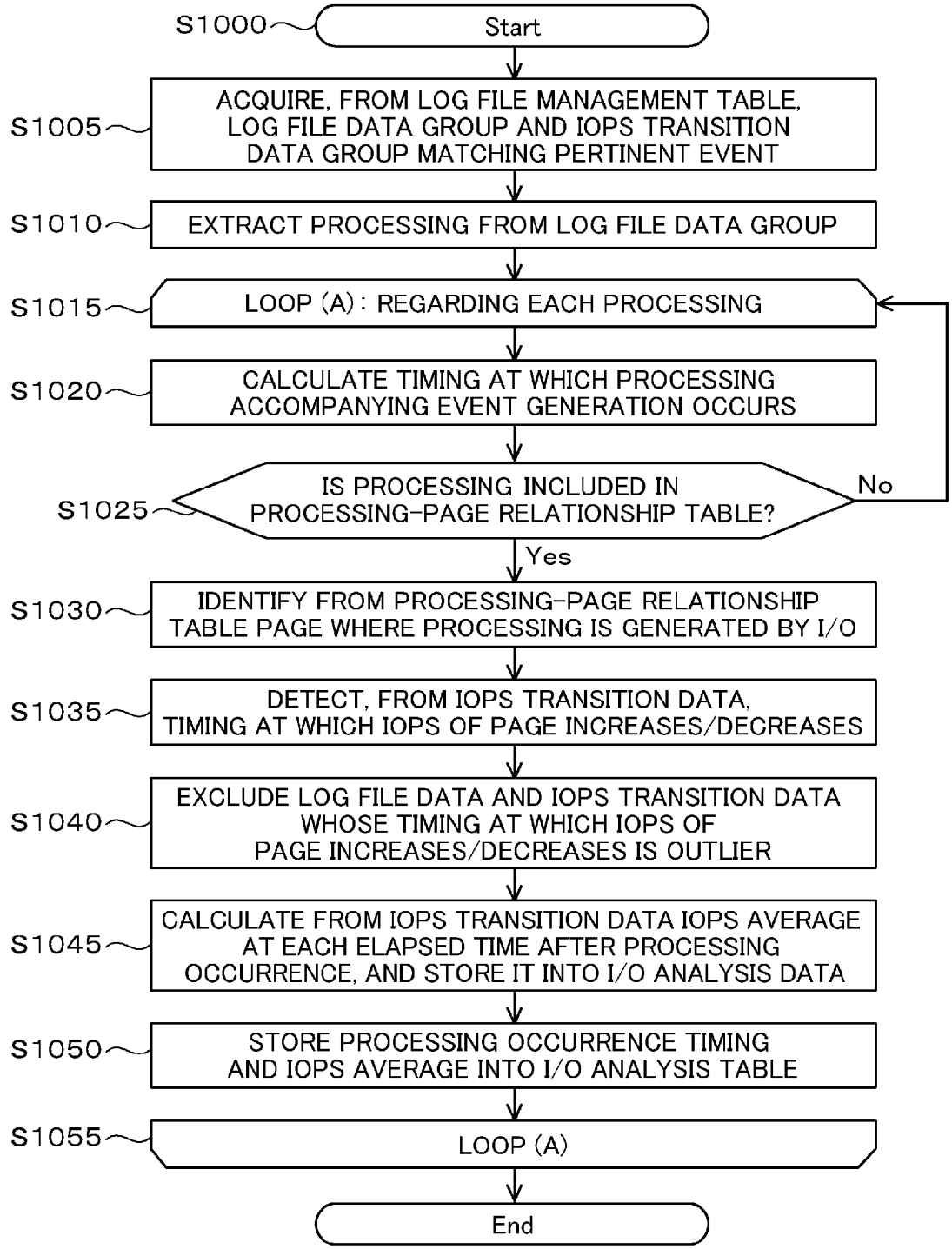

F I G . 2 0
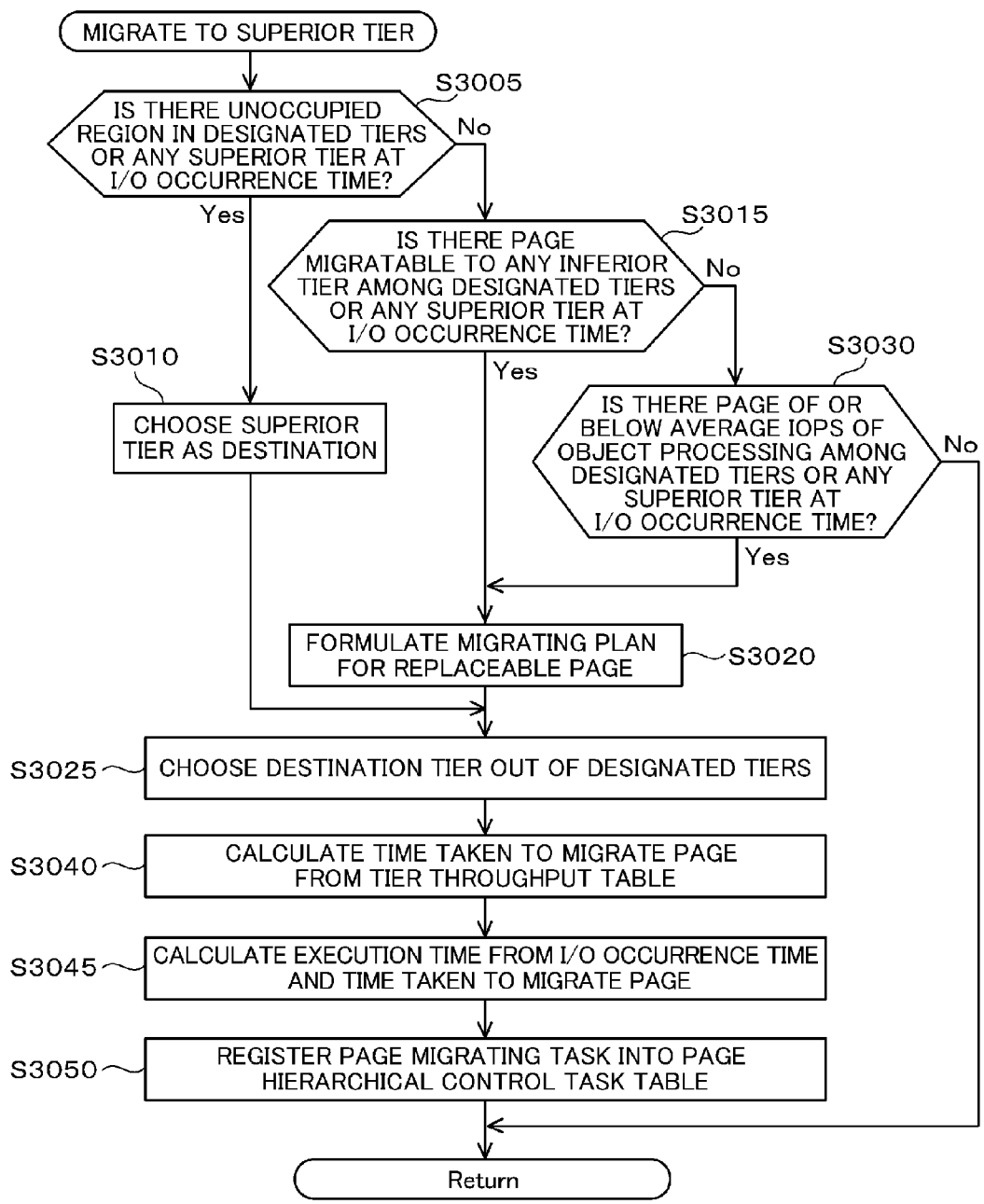

F I G. 2 6

| RELATIVE HIERARCHICAL STORAGE MANAGEMENT TABLE | | | | 1205 |
|---|---|---|---|---|
| SERVER NAME | RELATIVE Tier ID | ABSOLUTE Tier ID | | |
| | | TIER-PROVIDING MACHINE NAME | Tier ID | |
| SERVER1 | Tier1 | STORAGE1 | Tier1 | |
| | Tier2 | SERVER1 | Tier1 | |
| | Tier3 | STORAGE1 | Tier2 | |
| | Tier4 | STORAGE1 | Tier3 | |
| ... | ... | ... | ... | |
| 120501 | 120502 | 120503 | 120504 | |

COMPUTER SYSTEM AND METHOD FOR CONTROLLING HIERARCHICAL STORAGE THEREFOR

TECHNICAL FIELD

The present invention relates to a computer system and a method for controlling its hierarchical storage.

BACKGROUND ART

Generally, the amount of use of services fluctuates with such factors as timing. As a result, a storage system has to keep ready for its storage region having a performance level that can meet the demand in a situation in which the amount of use most increases in a large enough capacity for storing the increasing information. However, as investments in information system do not increase rapidly, inability to make available a required storage region is posing a problem.

In this connection, according to Patent Literature 1, where a storage system is provided with a storage region having a plurality of different characteristics (including input/output performance and bit cost), written-in data is split into fragments of a fixed size known as pages, and the pages are arranged in a storage region manifesting designated characteristics. And there is disclosed a technique by which the storage system, after data is arranged in the storage region manifesting the designated characteristics, rearranges in the storage region having an appropriate input/output performance according to the frequency of accessing the pertinent pages by a host computer.

For the convenience of description, hereinafter the storage region manifesting a plurality of different characteristics and provided in the storage system will be referred to as a storage tier, and each of the storage regions constituting the storage tier, as a tier. Further, processing to arrange pages in the storage tier and processing to rearrange pages will be referred to as hierarchical control.

According to Patent Literature 1, in generally expensive storage regions (to be referred to as superior tiers) with high input/output performance, it is possible to arrange only such data as requiring that performance, but when the use of the service abruptly increases, the data to be accessed by the service may not be arranged in any superior hierarchical storage. As a result, possibility for the information system to complete the service within the expected length of time poses a problem.

In view of this circumstance, Patent Literature 2 discloses a technique by which, where a response performance required to be satisfied by data used in an application program (hereinafter, an application program may be referred to simply as an application) (to be referred to as a response performance requirement) is assigned, the pertinent file is arranged in a memory device having an appropriate input/output performance for satisfying the response performance requirement is disclosed. According to Patent Literature 2, a delay or a stop in the processing of the application can be prevented by permanently arranging the data to be used by the application in a storage region satisfying the response performance requirement.

CITATION LIST

Patent Literature

Patent Literature 1: U.S. Patent Application Publication 2009/0300285

Patent Literature 2: U.S. Patent Application Publication 2012/0185426

SUMMARY OF INVENTION

Technical Problem

According to Patent Literature 2, data to be used by an application remains permanently arranged in a superior tier satisfying the response performance requirement irrespective of the state of use of the application. For instance, data to be accessed only at the time of activating an application remains arranged in the superior tier even when the application is not activated or after the activation of the application is completed. As a result, since data for which response performance is not always required depending on the state of use of the application is arranged in a superior tier, the superior tier is wastefully consumed.

Then, an object of the present invention is to restrain arrangement of less accessed data in a superior tier at each point of time by arranging appropriate data in a storage tier at an appropriate timing for the operation on the application, and at the same time to enhance the performance of response to the application.

Solution to Problem

In a typical method for controlling hierarchical storage according to the present invention is executed by a control unit of a computer system having a plurality of storage tiers differing in accessing performance, an application program executed by a processing unit of the computer system has specific process to access a storage area within the storage tiers, and comprises a first step of storing first information on matching between the specific process and the storage region; a second step of acquiring second information on access actions of the specific process over time; a third step of acquiring third information on the amount of access to the storage region over time; and a fourth step of identifying the time of variation of the amount of access from the second information and the third information on the basis of the first information and so determining a migration start time as to migrate data in the storage region among the storage tiers according to the time of variation of the amount of access.

Advantageous Effects of Invention

According to the invention, it is possible to arrange appropriate data in a storage tier at an appropriate timing for the operation on the application, restrain arrangement of less accessed data in a superior tier at each point of time, and at the same time to enhance the performance of response to the application.

BRIEF DESCRIPTION OF DRAWINGS

FIG. 4 is a diagram showing an example of configuration of a storage system.

FIG. 6 is a diagram showing an example of configuration of a subprogram page relationship table.

FIG. 7 is a diagram showing an example of configuration of an event analysis table.

FIG. 8 is a diagram showing an example of configuration of I/O analysis data.

FIG. 9 is a diagram showing an example of configuration of a job management table.

FIG. 10 is a diagram showing an example of configuration of a page hierarchical control task management table.

FIG. 11 is a diagram showing an example of configuration of IOPS transition data.

FIG. 12 is a diagram showing an example of configuration of log file data.

FIG. 13 is a diagram showing an example of configuration of a log file management table.

FIG. 14 is a diagram showing an example of configuration of a hierarchical storage performance management table.

FIG. 15 is a diagram showing an example of configuration of a log file.

FIG. 16 is a diagram showing an example of configuration of a page hierarchical control management table.

FIG. 17 is a diagram showing an example of configuration of a hierarchical storage capacity management table.

FIG. 18 is a diagram showing an example of flow chart of an I/O analysis program.

FIG. 20 is a diagram showing an example of flow chart of processing to migrate a page to a superior tier.

FIG. 26 is a diagram showing an example of configuration of a relative hierarchical storage management table in the Third Embodiment.

DESCRIPTION OF EMBODIMENTS

Figure 1:
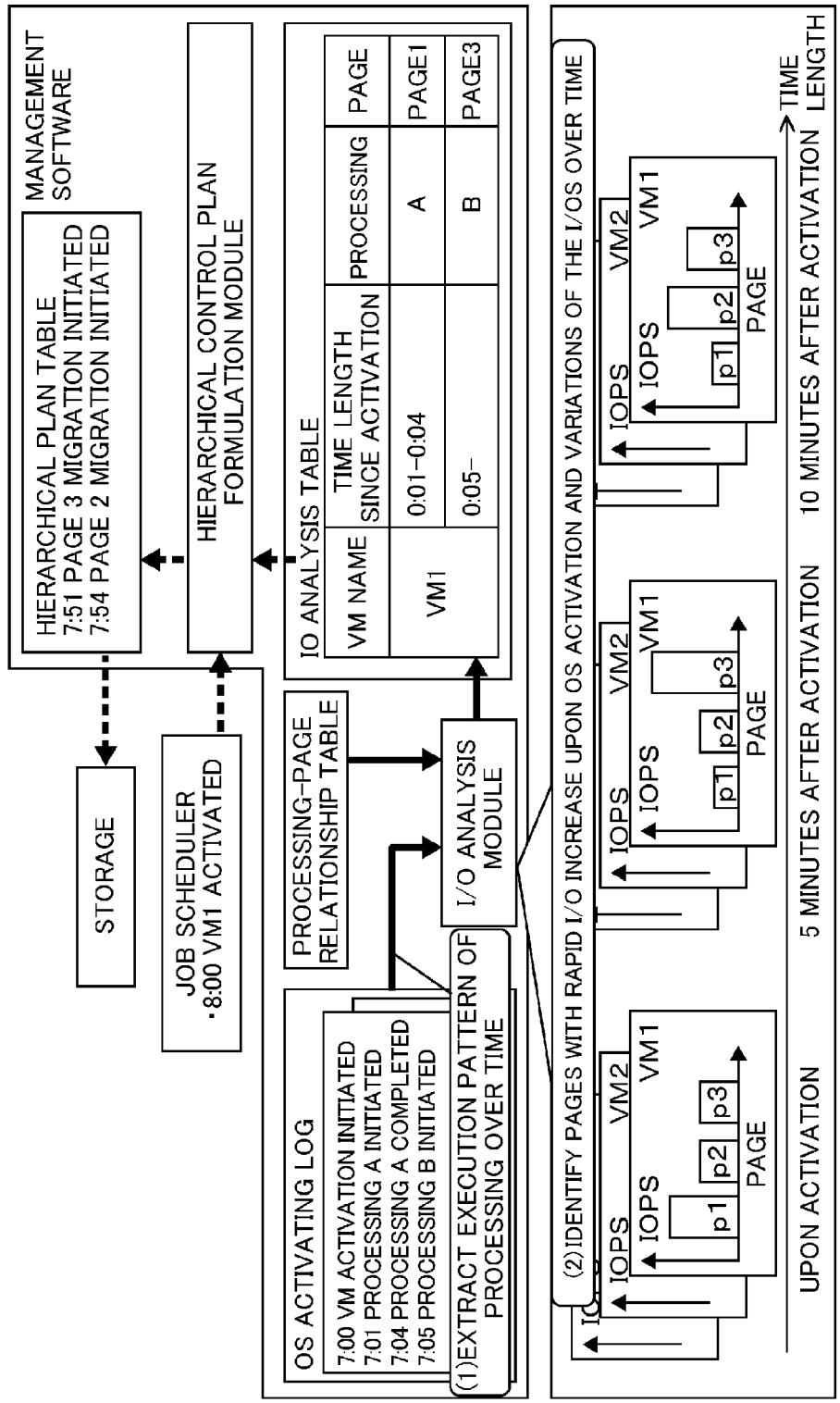
FIG. 1 is a diagram showing an outline of hierarchical control.

A preferable embodiment will be described below with reference to drawings. Incidentally, while various information may be expressed in an "xxx table" pattern in the following description, such information may as well be expressed in some other data structure than tables. To indicate non-dependence on a data structure, an "xxx table" may instead be referred to as "xxx information".

Further in the following description, whereas processing may sometimes be described in a sentence whose subject is a "program", since a prescribed processing is accomplished while appropriately using a storage resource (e.g. a memory) and/or a communication interface device (e.g. a communication port), the grammatical subject of processing may as well be a processor. A processing described by using a program as the subject of processing may be a processing accomplished by a processor or a management system having the processor (e.g. a computer or server for management use). Further, the controller may be the processor itself or include a hardware circuit accomplishing part or the whole of the processing to be accomplished by the controller. The program may be installed in each controller from the program source. The program source may be, for instance, a program distribution server or a storage medium.

To add, a management computer has an I/O device. Conceivable examples of I/O device include a display, a keyboard and a pointer device, but it may as well be some other device. Alternatively, as a substitute for the I/O device, a serial interface or an Ethernet interface (Ethernet is a registered trade mark) may be used as an I/O device, and connecting a display-use computer having a display, a keyboard or a pointer device to the interface to substitute for inputting and displaying by an input device by having it transmit display-use information to the display-use computer and receive input-use information from the display-use computer to enable the display-use computer to perform displaying or accept inputs.

Hereinafter, a set of more than one computer that manages a computer system and manages and controls a storage system may be referred to as a management system. When a management computer displays display-use information the management computer is a management system. A combination of a management computer and a display-use computer also is a management system. Also, for the purpose of increasing the speed and reliability of management processing, a plurality of computers may realize processing equivalent to the management computer, and in this case the plurality of computers (including a display-use computer when the display-use computer is to accomplish displaying) is the management system.

Whereas a word "time" is used in the following description, the time may indicate items of information such as year, month and day and, obviously, may also indicate hour, minute and second (including a below-decimal point second).

First Embodiment (1-1) Outline of this Embodiment

In a preferable embodiment, the execution pattern of a plurality of specific processes occurring in connection with operation on an application from log information on the application (hereinafter referred to as a subprogram or subprograms for the purpose of description; detailed description of the subprogram will be given afterwards), and a page accessed to a page by each subprogram and changes in the number of accesses over time are identified. Further, on the basis of the changes in the number of accesses by the subprogram over time, hierarchical control of pages is planned. In this way, appropriate data for operation on the application is arranged in storage tiers at appropriate timing.

FIG. 1 is a diagram showing an outline of this embodiment. Besides log information on the application, an execution pattern of processing over time can also be extracted from an OS activating log. Here, for instance VM corresponds to the application, and processing A and the like correspond to the subprogram of an application VM1. That the processing A accesses page 1 (p1) can be determined from a table of relationships between processes and pages, and measuring and analyzing accesses to pages (IOPS) relative to time can reveal variations over time that, while the number of accesses (I/O number) to page 1 is large at the time of activation, the number of accesses to page 3 by processing B rapidly increases five minutes after activation. For this reason, when a job scheduler has set VM1 to be activated at 8:00, migrating page 3 to the superior tier is started at 7:51 not to be later than 8:05, five minutes after the activation.

In FIG. 1, bold solid line arrows represent flows of information on I/O analysis, intended for preparation of a plan for hierarchical control of pages to be used in the next round of activation. Bold dotted line arrows represent flows of information for preparation of a plan for hierarchical control of pages to be used in the next round of activation and execution of the plan.

(1-2) Hardware Configuration of Computer System

Figure 2:
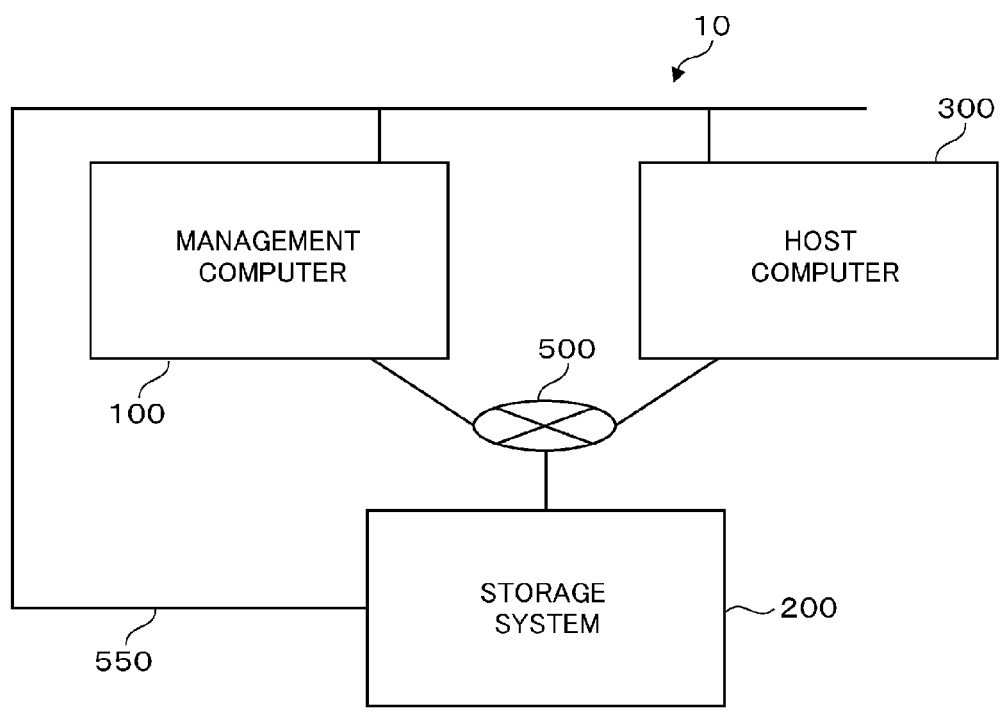
FIG. 2 is a diagram showing an example of configuration of a computer system.

FIG. 2 shows an example of hardware configuration of a computer system 10. The computer system 10 is configured of a management computer 100, a storage system 200 and a host computer 300. In the computer system 10, the management computer 100 and the host computer 300 may be the same computer, provided as one computer each or a plurality of computers. Further in the computer system 10, the storage system 200 may be one unit or a plurality of units. Also in the computer system 10, the host computer 300 and the storage system 200 may be the same computer, provided as one computer each or a plurality of computers.

The storage system 200 and the host computer 300 are connected to each other via a communication network (e.g. SAN (Storage Area Network)) 500. Further, the management computer 100 is connected to the host computer 300 and the storage system 200 via a communication network (e.g. LAN (Local Area Network)) 550. To add, the communication networks 500 and 550 may be separate networks as shown in FIG. 2 or the same network.

Figure 3:
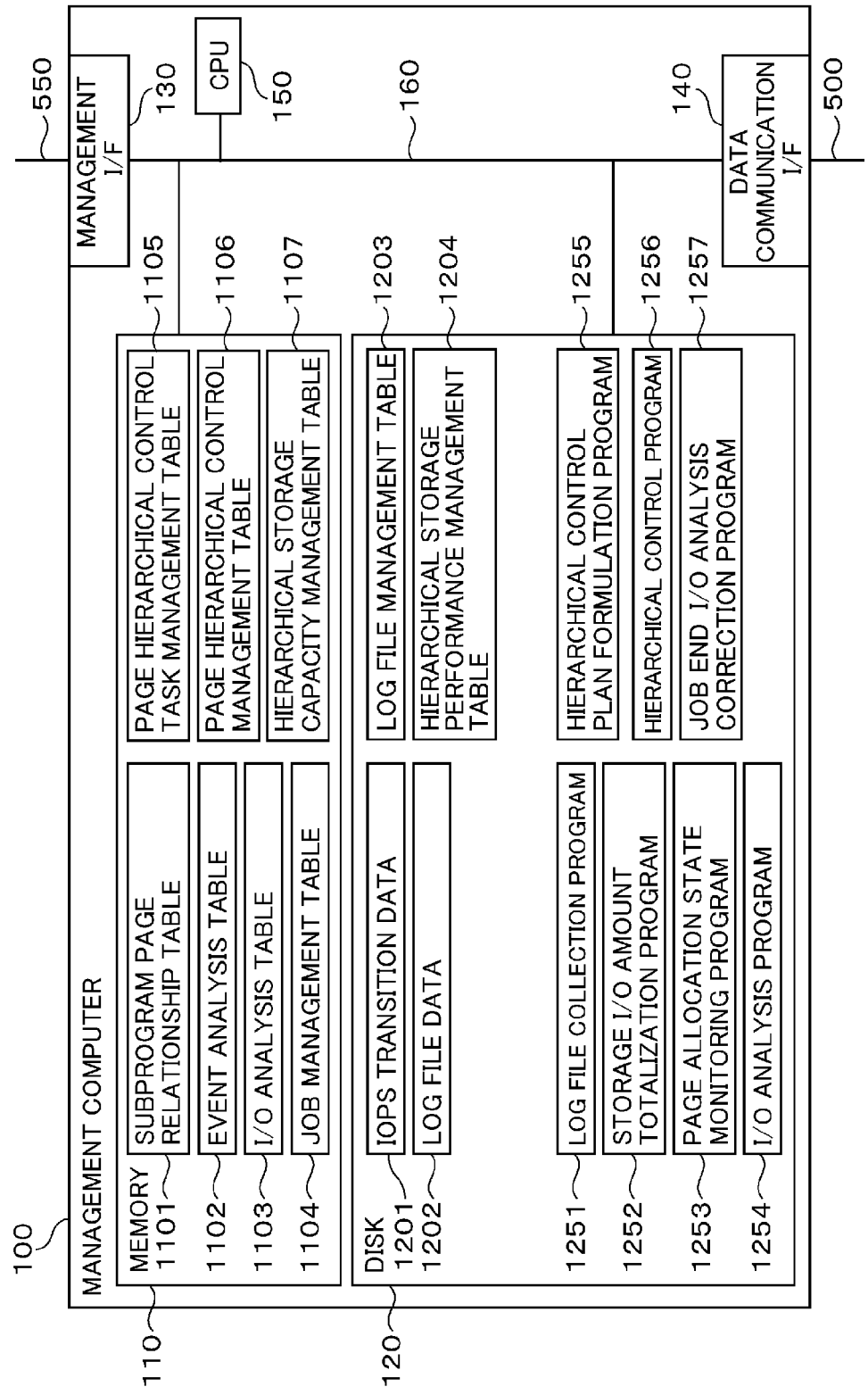
FIG. 3 is a diagram showing an example of configuration of a management computer.

FIG. 3 shows an example of configuration of the management computer 100. The management computer 100 is a computer having a memory 110, a disk 120, an I/F for management use 130, a data communication I/F 140 and a CPU 150. The memory 110, the disk 120, the I/F for management use 130, the data communication I/F 140 and the CPU 150 are connected to each other by an internal network 160.

The memory 110 stores information required by the CPU 150. More specifically, the memory 110 stores a subprogram page relationship table 1101, an event analysis table 1102, I/O analysis data 1103, a job management table 1104, a page hierarchical control task management table 1105, a page hierarchical control management table 1106 and a hierarchical storage capacity management table 1107.

The disk 120 stores programs to be executed by the CPU 150 and permanent information required by the CPU 150. More specifically, IOPS transition data 1201, the log file data 1202, a log file management table 1203, a hierarchical storage performance management table 1204, a log file collection program 1251, a storage I/O amount totalization program 1252, a page allocation state monitoring program 1253, an I/O analysis program 1254, a hierarchical control plan formulation program 1255, a hierarchical control program 1256 and a job end time I/O analysis correction program 1257.

The subprogram page relationship table 1101 stores subprograms to be executed in connection with operation of application programs executed by the CPU of the host computer 300 and information related to pages accessed by the subprograms. The event analysis table 1102 stores analytical information on subprograms executed in connection with execution of various operations on application programs stored in the memory of the host computer 300. The I/O analysis data 1103 stores the result of analysis regarding the storage system 200 when application programs have been executed by the host computer 300. The job management table 1104 stores jobs regarding various operations on application programs to be stored in the memory of the host computer 300. The page hierarchical control task management table 1105 stores task information on management operations on the storage system 200 regarding hierarchical control of pages. The page hierarchical control management table 1106 stores variations of information over time regarding tiers in which pages are arranged and the amount of access to the pages. The hierarchical storage capacity management table 1107 stores variations of tier capacities over time. Details on various tables to be stored in the memory 110 will be described afterwards.

A log file collection program 1251 is a program for collecting log files stored in the disk of the host computer 300. A storage I/O amount totalization program 1252 is a program for acquiring information representing the amount of access from the storage system 200 to pages (e.g. 10 PS). A page allocation state monitoring program 1253 is a program for monitoring the state hierarchical control over pages.

The I/O analysis program 1254 is a program for analyzing variations over time of the amount of access to the storage system 200 generated by subprograms. The hierarchical control plan formulation program 1255 is a program for formulating an execution plan for hierarchical control of pages. The hierarchical control program 1256 is a program for implementing hierarchical control of pages in accordance with the execution plan for hierarchical control of pages. The hierarchical control plan formulation program 1255 is a program for correcting I/O analysis results on the basis of the result of execution after job execution.

The IOPS transition data 1201 stores information indicating time variations of IOPS relative to pages. The log file data 1202 stores information on log files stored in the disk of the host computer 300. The log file management table 1203 stores information for managing the log file data 1202 that holds information on logs collected from the host computer 300. The hierarchical storage performance management table 1204 stores performance information on tiers. Details on various tables stored in the disk 120 will be described afterwards.

The I/F for management use 130 is an interface for connecting the storage system 200 and the host computer 300 via the communication network 500. The data communication I/F 140 is an interface for connecting the storage system 200 and the host computer 300 via the communication network 550. The CPU 150 performs various processes by execution programs stored in the disk 120. To add, though the I/F for management use 130 and the data communication I/F 140 are not the same in FIG. 3, the I/F for management use 130 and the data communication I/F 140 may as well be the same.

FIG. 4 shows an example of configuration of the storage system 200. The storage system 200 is equipped with a memory 210, a controller 220, a management IF 230, a data communication I/F 240 and a storage medium 250. The memory 210, the controller 220, the management IF 230, the data communication I/F 240 and the storage medium 250 are connected to each other via an internal network 260. To add, though the management IF 230 and the data communication I/F 240 are not the same in FIG. 4, the management IF 230 and the data communication I/F 240 may as well be the same.

The memory 210 stores programs to be executed by the controller 220 and information required by the controller 220. More specifically, the memory 210 stores an I/O amount monitoring program 2151 and a page allocation control program 2152. The I/O amount monitoring program 2151 is a program for monitoring the amount of access of the hierarchical storage to pages. The page allocation control program 2152 is a program for allocating pages to the real address space of the storage medium 250 constituting the storage region.

The controller 220 controls the actions of the storage system 200 by executing programs to be stored in the memory 210. The management IF 230 is an interface for connecting the management computer 100 and the host computer 300 via the communication network 550. The data communication I/F 240 is an interface for connecting the management computer 100 and the host computer 300 via the communication network 500.

The storage medium 250 stores data whose writing is requested by the host computer 300. The storage medium 250 may be media of multiple types differing in such characteristics as input/output performance and bit cost. For instance, it may be a combination of more than one types of medium such as an SSD (Solid State Disk) group 250A, an SAS (Serial Attached SCSI) magnetic disk group 250B and an SATA (Serial ATA) magnetic disk group 250C.

Figure 5:
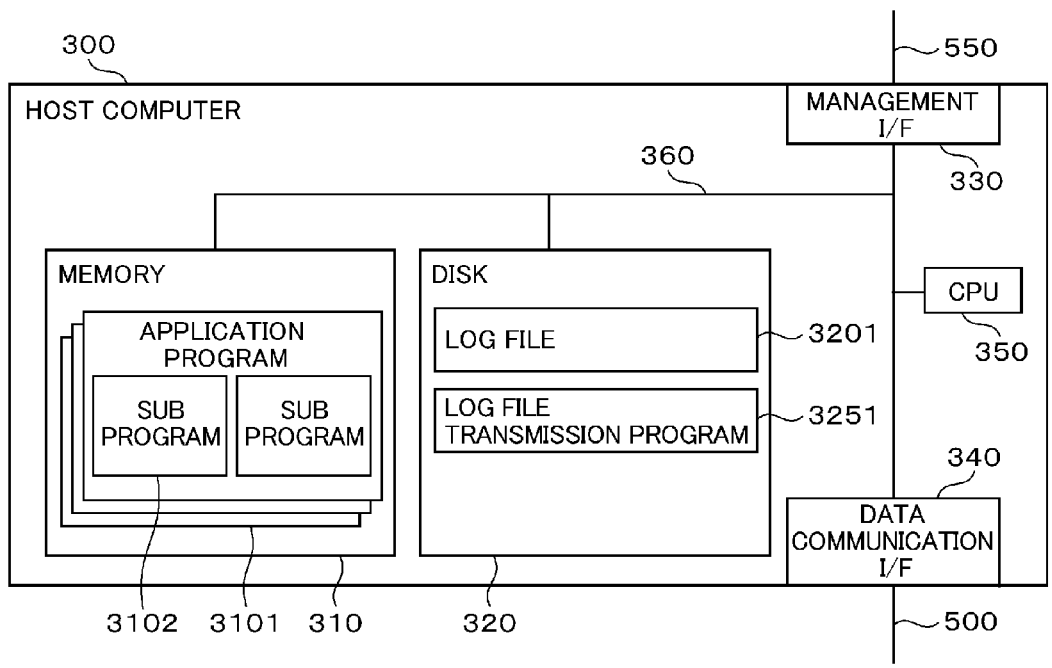
FIG. 5 is a diagram showing an example of configuration of a host computer.

FIG. 5 shows an example of configuration of the host computer 300. The host computer 300 is a computer having a memory 310, a disk 320, an I/F for management use 330, a data communication I/F 340 and a CPU 350. The memory 310, the disk 320, the I/F for management use 330, the data communication I/F 340 and the CPU 350 are connected to each other via an internal network 360.

The memory 310 stores programs to be executed by the CPU 350 and information and the like required by the CPU 350. More specifically, the memory 310 stores one or a plurality of application programs 3101. The application program 3101 is a program that defines various processes performed by the CPU 350.

The application program 3101 includes one or a plurality of subprograms 3102. The subprogram 3102 is a part or the whole of programs constituting processes of the application program 3101, and the program of processes generated in connection with operations on the application program 3101. The operations of the computer neither specially described nor shown include, for instance, inputting from an ordinary OS (Operating System) to the application program 3101, which may be activation inputting or data inputting by a user to the application program 3101 or interrupt inputting with a timer or the like.

The subprogram 3102 is not limited to processes directly generated by any operation. The subprogram 3102 may be a program automatically executed from any processing of the application program 3101 resulting from an operation on the application program 3101. Also, the subprogram 3102 may be a program executed by combination of a plurality of operations on the application program 3101. The subprogram 3102 may as well be a program executed by combined operations. Also, a program of processing generated with some relationship with operations on the application program 3101 may be the subprogram 3102.

For instance, it may be a DB (database) program regarding a mail automatically executed in connection with an operation by the manager to activate a mail server program, which is the application program 3101, a mail reception program generated in connection with a user's receiving operation, or a received mail list display program executed after execution of the mail reception program. To add, the subprogram 3102 is not limited to what has been described so far, but a program matching the following description of the subprogram 3102 may as well be the subprogram 3102.

The disk 320 stores programs executed by the CPU 350 and permanent information required by the CPU 350. More specifically, the disk 320 stores a log file 3201 and a log file transmission program 3251. The log file 3202 is a file that stores, when logs on various operations performed on the application program 3101 stored in the memory 310 and various operations performed on the application program 3101, logs and the like on the subprogram 3102 automatically executed by the application program 3101. The log file transmission program 3251 is a program for transmitting the log file 3201 to the management computer 100.

The I/F for management use 330 is an interface for connection of the management computer 100 and the storage system 200 via the communication network 500. The data communication I/F 340 is an interface for connection of the management computer 100 and the storage system 200 via the communication network 550. The CPU 350 performs various processes by executing programs stored in the disk 120. To add, though the I/F for management use 330 and the data communication I/F 340 are not the same in FIG. 5, the I/F for management use 330 and the data communication I/F 340 may as well be the same.

(1-3) Contents of Various Tables

FIG. 6 is a diagram showing an example of the subprogram page relationship table 1101 stored in the memory 110 of the management computer 100. The subprogram page relationship table 1101 is a table for managing programs to be executed by the CPU 350 of the host computer 300 and information related to pages to be accessed by the programs.

In an application name column 110101, the name of the application program 3101 to be executed by the CPU 350 of the host computer 300 is stored. In an operation type column 110102, the types of operation that can be performed on the application program 3101 to be executed by the CPU 350 of the host computer 300 are stored. In a server name column 110103, the name of the host computer 300 is stored. In a subprogram column 110104, a series of states of the subprogram 3102 recorded in the log file 3201 stored in the disk 320 of the host computer 300 when any operation is performed on the application program 3101 executed by the CPU 350 of the host computer 300 are stored. In a data ID column 110105, ID information on data used by the subprogram 3102 (e.g. directory paths of files and file names, data set names of data sets and so forth) is stored. In a page No. column 110106, page No. information on pages storing sets of data matching the data IDs stored in the data ID column 110105 is stored.

To add, the contents of the subprogram page relationship table 1101 may be inputted in advance from an input device, not shown, or the like of the management computer 100.

FIG. 7 is a diagram showing an example of the event analysis table 1102 stored in the memory 110 of the management computer 100. The event analysis table 1102 is analytical information on the subprogram 3102 executed in connection with the execution of various operations on the application program 3101 stored in the memory 310 of the host computer 300.

In an application name column 110201, the name of the application program 3101 to be executed by the CPU 350 of the host computer 300 is stored. In an operation type column 110202, the types of operation that can be performed on the application program 3101 to be executed by the CPU 350 of the host computer 300 are stored. In a server name column

110203, the name of the host computer 300 is stored. In a subprogram column 110204, a series of states of the subprogram 3102 recorded in the log file 3201 stored in the disk 320 of the host computer 300 when any operation is performed on the application program 3101 executed by the CPU 350 of the host computer 300 are stored. In a subprogram generation timing column 110205, the elapsed time since the implementation of operations on the application program 3101 executed by the CPU 350 of the host computer 300 until the state variation of the subprogram 3102 stored in the subprogram column 110204 occurs is stored. In an I/O analysis data ID column 110206, ID information on I/O analysis data indicating variations in the amount of access to the storage system 200 in connection with state variations of the subprogram column 110204 to be stored in the subprogram 3102 is stored.

FIG. 8 is a diagram showing an example of the I/O analysis data 1103 stored in the memory 110 of the management computer 100. The I/O analysis data 1103 is information regarding the result of analysis of accesses to the storage system 200 when the subprogram 3102 is executed by the CPU 350 of the host computer 300.

In an I/O analysis data ID column 110301, ID information for identifying the I/O analysis data 1103 is stored. The pertinent ID information is issued for each combination of information to be stored in the application name column 110201, the operation type column 110202, the server name column 110203 and the subprogram column 110204 of the event analysis table 1102.

In an elapsed time column 110302, there is stored the elapsed time since the occurrence of state variation of the subprogram 3102 stored in the subprogram generation timing column 110205 of the event analysis table 1102. The pertinent elapsed time shown in FIG. 8 (every 60 seconds) is only an example, and the time intervals may be different from this one. In a page No. column 110303, there is stored No. information on pages where No. information on pages on which data to be used by the subprogram 3102 is stored. In an average IOPS column 110304, there is stored information indicating the amount of access (IOPS) occurring to pages in whose page No. column 110303 No. information is stored during the elapsed time, which is stored in the elapsed time column 110302. In a designated tier column 110305, there is stored No. information on one or a plurality of tiers designated to be stored in the page No. column 110303.

To add, tier information designated in the designated tier column 110305 is set by a program stored in the management computer 100. For instance in this embodiment, the hierarchical control plan formulation program 1255 sets it on the basis of performance information on the storage system. However, this is but one example and, for instance, the user may set it on the basis of input values, or the host computer 300 may set if on the basis of the required performance of the application program 3101. Also, by making available in the management computer 100 a program for setting the designated tier column 110305, a program stored in the host computer 300 may be enabled to alter the designated tier through that program. To add, the setting may as well be based on some other indicator than the performance.

FIG. 9 is a diagram showing an example of the job management table 1104 stored in the memory 110 of the management computer 100. The job management table 1104 is information for managing jobs regarding various operations on the application program 3101 stored in the memory 310 of the host computer 300.

In a job ID column 110401, ID information for identifying jobs is stored. In an execution time column 110402, the times of executing jobs is stored. In an application name column 110403, the name of the application program 3101 to be executed by the CPU 350 of the host computer 300 is stored. In an operation type column 110404, the types of operation that can be performed on the application program 3101 to be executed by the CPU 350 of the host computer 300 is stored. In a server name column 110405, the name of the host computer 300 is stored.

FIG. 10 is a diagram showing an example of the page hierarchical control task management table 1105 stored in the memory 110 of the management computer 100. The page hierarchical control task management table 1105 shows information on management operation tasks on the storage system 200 regarding hierarchical control of pages.

In a hierarchical control task ID column 110501, ID information for identifying tasks is stored. In an the execution time column 110502, future times at which tasks are scheduled for execution or past times at which tasks were executed are stored. In a scheduled completion time column 110503, future times at which tasks are scheduled for completion at the respective execution times of tasks are stored. In a completion time column 110504, if a task is not completed, "-" is stored to indicate that the task is not completed or, if a task is completed, the time at which the task was completed is stored. To add, "-" indicating incompletion of the task is but one example, but some other form of indication may be used as well. In a page ID column 110505, the Nos. of pages under hierarchical control are stored. In a destination tier column 110506, the destination tier Nos. of the pages are stored. In a job ID column 110507, ID information on the jobs using the Nos. of pages under hierarchical control is stored.

FIG. 11 is a diagram showing an example of the IOPS transition data 1201 stored in the disk 120 of the management computer 100. The IOPS transition data 1201 is information showing variations over time of the amount of access (IOPS) to pages.

In an IOPS transition data ID column 120101, there are stored IDs that are identifiers differing from one storage system 200 to another. In a time column 120102, time information on the measured amount of access to pages by the storage system 200 is stored. In a page No. column 120103, the Nos. of pages the amount of access to which has been measured by the storage system 200 is stored. In an IOPS column 120104, information indicating the amount of access to pages of Nos. stored in the page column 120103 having occurred during the time stored in the time column 120102 (e.g. IOPS) is stored.

FIG. 12 is a diagram showing an example of log file data 1202 stored in the disk 120 of the management computer 100. The log file data 1202 is information on the log file 3201 collected from the host computer 300.

In a log file ID column 120201, ID information for identifying the log file 3201 collected from the host computer 300 is stored. In a time column 120202, information on the execution times of various subprograms 3102 in connection with operations on the application program 3101 is stored, and in a subprogram column 120203, the state of the subprogram 3102 is stored. The time column 120202 and the subprogram column 120203 respectively match a time column 320103 and a subprogram column 320104 of the log file 3201 (details will be described afterwards with reference to FIG. 15) collected from the host computer.

FIG. 13 is a diagram showing an example of log file management table 1203 stored in the disk 120 of the management computer 100. The log file management table 1203 is information related to the IOPS transition data 1201 and the log file data 1202.

In an application name column 120301, the name of the application program 3101 to be executed by the CPU 350 of the host computer 300 is stored. In an operation type column 120302, the type of operation executed buy the CPU 350 of the host computer 300 on the application program 3101 is stored. In a server name column 120303, the name of the host computer 300 is stored. In an execution time column 120304, the time at which an operation to be stored into the operation type column 120302 was executed on the application program 3101 to be stored into the application name column 120301 is stored. In a log file ID 120305, an ID to identify the log file data 1202 is stored. The sets of information stored in the application name column and the operation type column 120302 respectively match the sets of information (320103 and 320104) matching the log file data 1202 indicated by log files ID stored in the log file 3201 and the log file ID columns 120305 on the same line.

FIG. 14 is a diagram showing an example of the hierarchical storage performance management table 1204 stored in the disk 120 of the management computer 100. The hierarchical storage performance management table 1204 is performance information on each tier.

In a tier ID column 120401, tier information is stored. For instance in FIG. 14, the smaller this tier No., the higher the performance levels (e.g. throughput and IOPS) of the storage region. In a Read throughput column 120402, the read performance (e.g. MB/s) of the pertinent tier is stored and, in a Write throughput column 120403, the write performance (e.g. MB/s) of the pertinent tier. In an upper limit IOPS column 120404, the upper limit of the IOPS can the pertinent tier can respond to is stored. To add, though it was stated that the smaller the tier No. in FIG. 14, the higher the performance levels, but this is not the only applicable content. For instance, the name of the medium constituting the tier, instead of the tier No., can as well be used as the content of the tier ID column 120401.

FIG. 15 is a diagram showing an example of the log file 3201 stored in the disk 320 of the host computer 300. The log file 3201 is a file for log information on the application program 3101.

In an application name column 320101, the name of the application program 3101 to be executed by the CPU 350 of the host computer 300 is stored. In an operation type column 320102, the type of the application program 3101 that the CPU 350 of the host computer 300 can operate on is stored. In a time column 320103, the execution time information of the subprogram 3102 in connection with operation on the application program 3101 is stored.

In a subprogram column 320104, the state of the subprogram 3102 is stored. The subprogram 3102 here is, for instance, one or another of the subprograms described below. First type subprogram: A subprogram automatically executed by the application program 3101 in connection with execution of an operation on the application program 3101. Second type subprogram: A subprogram executed by the following operation executed on the application program 3101 after execution of the operation on the application program 3101. Third type subprogram: A subprogram executed by utilization of the application program 3101 after execution of the operation on the application program 3101.

To add, the subprogram is an example of the subprogram 3102 executed in connection with execution of an operation on the application program 3101, but it may as well be a subprogram executed at some other momentum, as a result of some causal relationship or by executing means.

FIG. 16 is a diagram showing an example of the page hierarchical control management table 1106 stored in the memory 110 of the management computer 100. The page hierarchical control management table 1106 information on variations of information indicating the amounts of accesses to the tier in which a page is arranged and to the page.

In a time column 110601, time sections marked at fixed intervals are stored; more specifically, pairs each of a start time and an end time are stored. In a page No. column 110602, Nos. for identifying pages are stored. In a tier ID column 110603, at the corresponding time in the time column 110601, the No. of the tier in which the page is to be arranged is stored. In an IOPS column 110604, information (e.g. IOPS) indicating the number of accesses to the page is stored. In a designated tier column 110605, the No. of the tier in which the page is designated to be arranged at the time of the time column 110601 is stored.

FIG. 17 is a diagram showing an example of the hierarchical storage capacity management table 1107 stored in the memory 110 of the management computer 100.

In a time column 110701, time sections divided at fixed intervals are stored; more specifically, pairs each of a start time and an end time are stored. In a tier ID column 110702, tier Nos. are stored. In an overall capacity (GB) column 11070, the capacity available for use by the tier are stored; more specifically, it is the sum of the capacity of the storage region to which page are already allocated and the unoccupied capacity (GB) to be described afterwards. An unoccupied (GB) column 110704 shows the tier capacity to which pages can be allocated. A fixed capacity (GB) column 110705 shows the total capacity of pages arranged in a fixed manner in the tier of the tier ID column 110702 in the time sections of the time column 110701.

(1-4) Details of Actions of Computer System (1-4-1) Details of Actions of I/O Analysis First, the actions of I/O analysis by the management computer 100 will be described in detail. The management computer 100, using the IOPS transition data 1201 and the log file data 1202 stored in the disk 120, analyzes the execution timing of the subprogram 3102 executed in connection with an operation performed on the application program 3101 executed by the CPU 350 of the host computer 300 on the basis of the I/O analysis program 1254 and I/O to or from the storage system 200 by the subprogram 3102.

The IOPS transition data 1201 and the log file data 1202 used by the I/O analysis program 1254 are generated by the storage I/O amount totalization program 1252 and the log file collection program 1251, respectively. The IOPS transition data 1201 is generated by the execution of the storage I/O amount totalization program 1252 by the CPU 150 of the management computer 100 to execute, for instance, the following processes (a1) and (a2).
(a1) The storage I/O amount totalization program 1252 periodically acquires the cumulative total number of accesses to a page from the storage system 200.
(a2) The storage I/O amount totalization program 1252, when it receives from the storage system 200 the cumulative total number of accesses to the page, calculates from the totalized result the difference from the cumulative total received last time, and adds to the IOPS transition data 1201 the number of accesses made to the page during the period between the last reception time and the latest reception time.

The storage system 200, in preparation for execution of (a1) above, executes the I/O amount monitoring program 2151 with the controller 220 and performs, for instance the following processes (b1) and (b2).

(b1) In accordance with the I/O amount monitoring program 2151, the controller 220 monitors the number of accesses to a page, and holds the cumulative total number of accesses to the page.

(b2) The I/O amount monitoring program 2151 transmits the cumulative total number of accesses to the management computer 100 in response to a request for transmission of the cumulative total number of accesses resulting from execution of (a1) above.

The log file data 1202 is generated by execution of the log file collection program 1251 by the CPU 150 of the management computer 100 to execute, for instance, the following processes (c1) through (c3).

(c1) The log file collection program 1251 periodically collects the log file 3201 for the host computer 300.

(c2) The log file collection program 1251 generates the log file data 1202 on the basis of the time 320103 and the subprogram information 320104 included in the log file 3201.

(c3) The log file collection program 1251 adds to the log file management table 1203 the ID of the log file data 1202, generated by (c2) as stated above, together with information of the application name 320101 and the operation type 320102.

To add, periodic execution of the log file collection program 1251 is one example of possible momentums for execution of the log file collection program 1251, and it may as well be executed upon completion of job execution as a momentum.

Further the host computer 300, when it receives from the management computer 100 a request for acquisition of the log file 3201 (e.g. the request for log file collection in (c1) above), transmits the log file 3201 to the management computer 100 in accordance with the log file transmission program 3251.

An example of flow chart of the I/O analysis program 1254 is shown in FIG. 18. The CPU 150 of the management computer 100 (hereinafter to be described as the management computer 100) periodically executes the I/O analysis program 1254 with a combination of the application name 120301 and the operation type 120302 and the server name 120303 shown in FIG. 13 as the input. Some other momentum of execution may as well be adopted; for instance it may be the timing of collecting the log file 3201 from the host computer 300 in accordance with the log file collection program 1251. Further, for the purpose of description, the combination of the application name 120301 and the operation type 120302 and the server name 120303 will be referred to as an event. Also, execution of an operation on the application program 3101 by the CPU 350 of the host computer 300 indicated by the event will be referred to as generation of an event.

The management computer 100, when the I/O analysis program 1254 is executed, acquires from the log file management table 1203 all the log file IDs 120305 matching the event given as the input. Next, it acquires the log file data 1202 matching the acquired log file IDs 120305 (step S1005).

Next, the management computer 100 compares the group of log file data 1202 acquired at step S1005, and presumes the subprogram 3102 to be executed upon occurrence of an event on the basis of information on the number of sets of the log file data 1202 when the subprogram 3102 of the subprogram column 120203 emerges (step S1010). The usable method of presumption here may be statistical hypothesis testing or the like. More specifically, first, a hypothesis that a specific subprogram 3102 is executed when an event has occurred is set. A suitable significant level (e.g. 1%) is set, and hypothesis testing can be done about the log file data 1202. The probability of emergence of the subprogram 3102 of the subprogram column 120203 in the log file data 1202 can be calculated from the ratio of log file data in which the subprogram 3102 of the subprogram column 120203 in two or more sets of log file data 1202 emerges to all the sets of log file data.

The management computer 100 executes processing of each subprogram 3102 from step S1020 to step S1050 once or a plurality of times (step S1015 and step S1055).

The management computer 100 acquires from the log file data 1202 in which the subprogram 3102 emerges, out of the log file data group 1202 used at step S1010, a time 120202 at which the subprogram 3102 was executed. Further, the management computer 100 acquires from the log file management table 1203 the execution time 120304 of the event matching the log file ID 120201 of the log file data 1202 in which the subprogram 3102 emerges, out of the log file data group used at step S1010. Next, the management computer 100 calculates on the basis of information of the execution time 120304 of one or more events acquired as stated above and the time 120202 at which the subprogram 3102 was executed matching the execution time 120304, the elapsed time since the occurrence of the event until the execution of the subprogram 3102.

The management computer 100 estimates the elapsed time since the occurrence of a representative event until the execution of the subprogram 3102 on the basis of the group elapsed time since the occurrence of each event calculated from two or more sets of log file data 1202 as described above until the execution of the subprogram 3102. As the method of estimation, for instance, a feature detection method such as a differential edge detection method. More specifically, the feature detection method may be applied to the group of elapsed times to detect an elapsed time which is a characteristic value (hereinafter, for the purpose of description, a representative elapsed time since the occurrence of a presumed event until the execution of the subprogram 3102 will be referred to as the timing of executing the subprogram 3102) (step S1020).

At step S1025, the management computer 100 references the subprogram page relationship table 1101 shown in FIG. 6 and determines whether or not sets of information (110101 through 110103) matching the event given as an input to the I/O analysis program 1254 are included in the subprogram page relationship table 1101. If they are, it determines whether or not information (110104) of the subprogram 3102 is included in the subprogram page relationship table 1101.

If the result of determination at step S1025 is negative, processing of the pertinent subprogram 3102 is stopped, and processing regarding another subprogram 3102 is started at step 1015.

If the result of determination at step S1025 is affirmative, the management computer 100 acquires from the subprogram page relationship table 1101 an event and a page No. matching the subprogram 3102 from the page No. column 110106 (step S1030).

The management computer 100 acquires from the log file data group 1202 in which the subprogram 3102 used at step 1020 emerges the time group in which the subprogram 3102 is executed. And it extracts from the IOPS transition data 1201 the IOPS transition at each of the times referred to above.

The management computer 100 executes, for instance, the following processing steps (d1) through (d3) on the basis of the IOPS transitions acquired by the foregoing processes, and extracts the timing of variation of the number of accesses to the page matching the page No. in the page No. column 110106 identified at step S1030 (hereinafter, for the purpose of description, the elapsed time since the occurrence of the subprogram 3102 until the variation of the number of accesses to the page will be expressed as the timing of variation of the number of accesses to the page) (step S1035).

(d1) From the IOPS transition data 1201 shown in FIG. 11, the time column 120101 matching the page No. in the page No. column 110106 identified at step 1030 and information of the IOPS column 120104 are acquired.

(d2) From the transition of the IOPS value in the IOPS column 120104, the time at which the IOPS value varies greatly is detected. As the detection method, for instance, a feature detection method such as a differential edge detection method.

(d3) From the time detected as stated in (d2) above, the execution timing of the subprogram 3102 and the time in the execution time column 120304 of the event, the elapsed time since the execution of the subprogram 3102 until The IOPS value varies is calculated.

Next, the management computer 100 detects any outlier regarding the timing of variation of the IOPS value relative to the page calculated at step S1035. In the processing at and after step S1045, the management computer 100 performs processing with the IOPS transition matching the detected outlier and the log file data 1202 matching it. As the outlier detection method, for instance a statistical outlier detection method may be used (step S1040).

The management computer 100, on the basis of IOPS transitions at the execution times of the subprogram 3102 stored in the log file data 1202 to be processed, calculates the average of IOPS values in the elapsed time since the execution of each subprogram 3102 on each page acquired at step S1030. Further, the management computer 100 stores the time in an elapsed time column 110302 after the execution of the subprogram 3102 into the I/O analysis data 1103, the page No acquired at step S1030 into a page No. column 110303 and the average of IOPS values calculated as described above into an average IOPS column 110304. To add, the method using the average is but on example, but some other statistical method using a median or the like can be used as well (step S1045).

The management computer 100 at step S1050 stores into the event analysis table 1102 shown in FIG. 7 information on the pertinent event (110201 through 110203), information of the subprogram 3102 (110204), the execution timing of the subprogram 3102 calculated at step S1020 (110205) and the ID of the I/O analysis data 1103 (110206) generated at step S1050.

At step S1055, the management computer 100 determines, with respect to every subprogram 3102 extracted at step S1010, whether or not the processes at step S1020 through step S1050 have been executed. If the processes at step S1020 through step S1050 have been executed on every subprogram 3102, the I/O analysis program 1254 is ended. If the processes at step S1020 through step S1050 have not been executed on every subprogram 3102, the flow returns to step S1015, and processing is started on other subprograms 3102 extracted at step S1010.

As described so far, execution of the I/O analysis program 1254 by the management computer 100 makes possible analysis of I/O variations to and from pages over time during the execution of the subprogram 3102 in connection with event execution on the basis of the IOPS transition data 1201 acquired from the log file 3201 and the storage system 200 stored in the disk 320 of the host computer 300. To add, though the foregoing description supposed presumption of the subprogram 3102 executed in connection with an event from probability information on the execution of the subprogram 3102 in the log file data 1202, the subprogram 3102 may as well be notified to the management computer 100 by the user's designation or otherwise. In that case, the processes from step S1005 through step S1010 would be unnecessary.

(1-4-2) Details of Actions of Hierarchical Control Plan Formulation

Actions of the management computer 100 to formulate a hierarchical control plan will be described in detail. The management computer 100, using the event analysis table 1102 stored in the disk 120, generates tasks for performing hierarchical control over the storage system 200 on the basis of the hierarchical control plan formulation program 1255.

Figure 19:
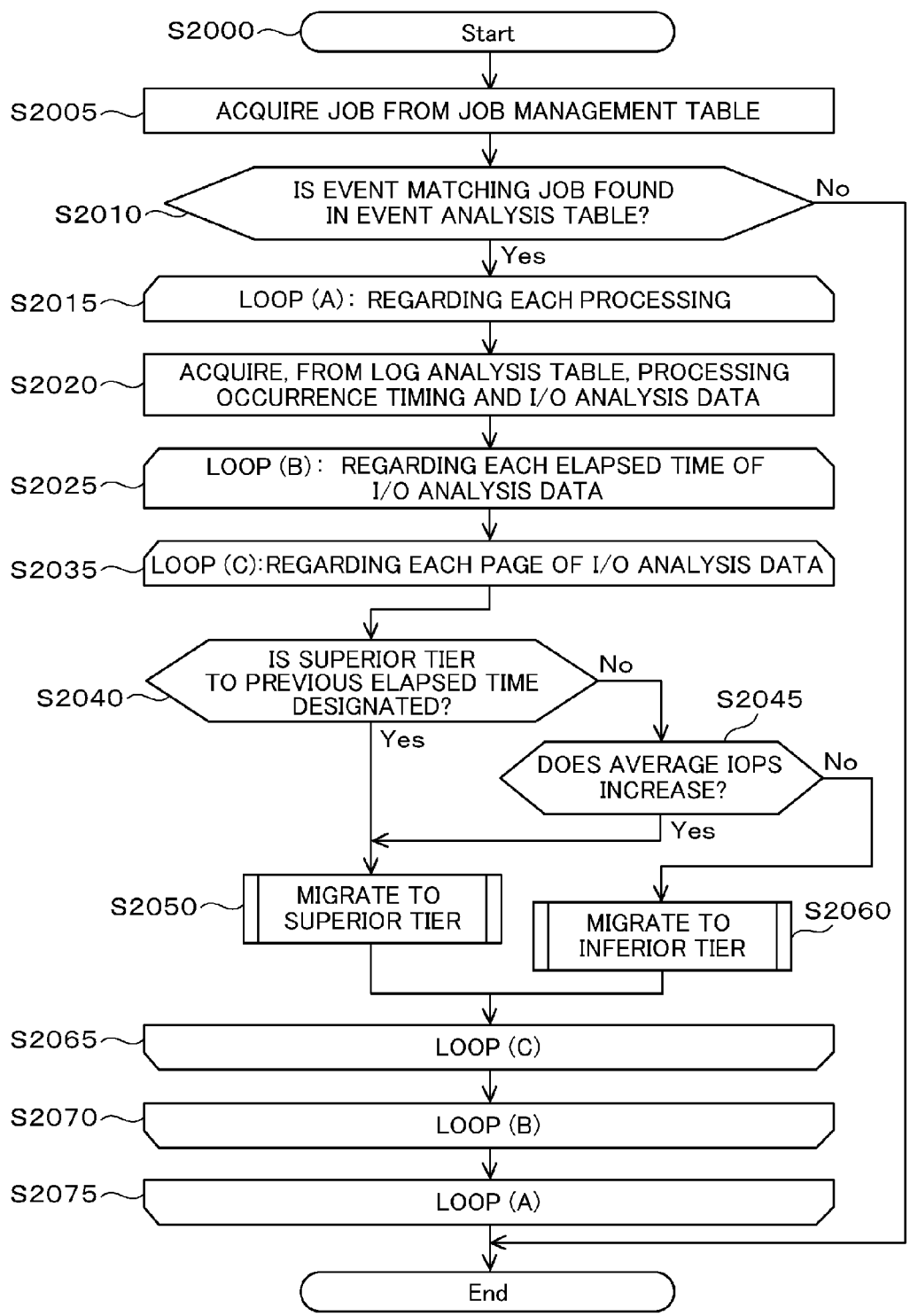
FIG. 19 is a diagram showing an example of flow chart of a hierarchical control plan formulation program.

FIG. 19 shows an example of flow chart of hierarchical control plan formulation program 1255 for the management computer 100. The management computer 100 starts implementing the hierarchical control plan formulation program 1255 when a new job is added to the job management table 1104 shown in FIG. 9 (step S2000). First, the management computer 100 acquires the newly added job from the job management table 1104 (step S2005).

The management computer 100 extracts information of an event (the application name column 110403, the operation type column 110404 and the server name column 110405) from the job, and determines whether or not the event analysis table 1102 shown in FIG. 7 includes information matching the extracted event (step S2010). If at step S2010 no information matching the event is found included, processing of the hierarchical control plan formulation program 1255 is ended.

If, on the other hand, information matching the event is found included at step S2010, the management computer 100 acquires from the subprogram column 110204 of the event analysis table 1102 a list of subprograms 3102 generated in connection with event execution. The management computer 100 executes processing of step S2020 through step S2070 that follow on each of the acquired subprogram 3102 as loop (A) once or a plurality of times (step S2015).

At step S2020, the management computer 100 identifies the elapsed time since the event generation until execution of the subprogram 3102 and the I/O analysis data matching the event to be processed and the subprogram 3102, and acquires them from the subprogram generation timing column 110205 and the I/O analysis data ID column 110206 of the event analysis table 1102 (step S2020).

The management computer 100 acquires elapsed times since the execution of the subprogram 3102 from the elapsed time column 110302 of the I/O analysis data 1103 identified from the ID of the I/O analysis data acquired at step S2020. The management computer 100 executes processing of step S2030 through step 2065 that follow on each of acquired elapsed times as a loop (B) once or a plurality of times (step S2025).

The management computer 100 acquires from the page No. column 110303 of the I/O analysis data 1103 identified from the ID of the I/O analysis data acquired at step S2020 the pages referenced by the subprogram 3102 at the pertinent elapsed time. The management computer 100 executes processing of step S2040 through step 2060 that follow on each of the acquired page as a loop (C) once or a plurality of times (step S2035).

The management computer 100 at step S2040 determines whether or not a tier designated for arrangement of the pertinent page is higher in input/output performance than the previous elapsed time step. Since it is defined that, as described with reference to FIG. 14, the smaller the tier No., the higher the performance levels (e.g. throughput and IOPS) of the storage region, it references the designated tier column 110305 of the I/O analysis data 1103 and determines whether or not tiers bearing smaller Nos. than the I/O analysis data 1103 along with the variation of the elapsed time step are designated. Further, as a result of referencing the designated tier column 110305 of the I/O analysis data 1103, it is found that no tier in which to arrange pages was designated at the previous elapsed time step and a tier in which to arrange pages is designated at the present elapsed time step, an affirmative determination is made, or if no tier in which to arrange pages is designated at the present elapsed time step, a negative determination is made.

To add, at the first time of loop (C) execution, if a tier in which to arrange pages is designated at the present elapsed time step, an affirmative determination is made or, if no tier in which to arrange pages is designated, a negative determination is made.

If the result of determination at step 2040 is a negative one, the management computer 100 references the I/O analysis data 1103 and compares the IOPS value of the page at the previous elapsed time step and the IOPS value of the page at the present elapsed time step. To add, if it is the first execution of loop (C), in order to decide upon an appropriate tier for the pertinent page in comparison with the IOPS values of other pages, the management computer 100 makes an affirmative determination after designating every tier No. to the designated tier column 110305 of the object I/O analysis data 1103 (step S2045).

If the result at step S2040 is affirmative or is negative and the result at step S2045 is affirmative, the management computer 100 at step S2050 executes processing to migrate a page to be referred to afterwards to a superior tier. Or if the result at step S2040 is step S2040 is negative and the result at step S2045 is also negative, the management computer 100 at step S2060 executes processing to migrate a page to be referred to afterwards to an inferior tier.

At step S2065, the management computer 100 determines whether or not processing has been performed on every object page of loop (C). If processing has been performed, the management computer 100 executes step S2070 or, if not, the management computer 100 returns processing to step S2035. At step S2070, the management computer 100 determines whether or not processing has been performed on every object page of loop (B). If processing has been performed, the management computer 100 executes step S2075 or, if not, the management computer 100 returns processing to step S2025. At step S2075, the management computer 100 determines whether or not processing has been performed on every object page of loop (A). If processing has been performed, the management computer 100 ends the hierarchical control plan formulation program 1255 or, if not, the management computer 100 returns processing to step S2015.

Processing for migrating a page to a superior tier (step S2050 in FIG. 19) will be described in detail with reference to FIG. 20.

At step S3005, the management computer 100 calculates the object time information from a new job stored in the job management table 1104 shown in FIG. 9, which is input information for the hierarchical control plan formulation program 1255; the subprogram 3102, which is the object of processing in a state of executing step S2050; the elapsed time since the subprogram 3102 was executed; and page information. More specifically, the management computer 100 calculates the time from the time of job generation from the execution time column 110402 of the job management table 1104, the elapsed time since event generation from the subprogram generation timing column 110205 of the event analysis table 1102, the elapsed time since event generation until execution of the subprogram 3102 and the elapsed time since execution of the subprogram 3102, which is the object or processing (hereinafter, the time calculated here will be referred to as the I/O occurrence time for the purpose of description).

Next, the management computer 100 references the hierarchical storage capacity management table 1107 and acquires capacity information (the overall capacity column 110703, the unoccupied capacity information column 110704 and the fixed capacity column 110705) on each tier at the I/O occurrence time. Further, the management computer 100 acquires, in the I/O analysis data 1103 which is the object of processing when executing step S2050, the tier No. of the designated tier No. column 110305 matching the elapsed time and the page number, which are the objects of in-column processing of the elapsed time column 110302 and the page No. column 110303. The management computer 100 determines from the unoccupied capacity information on each tier and information on tier No. whether or not there is any unoccupied capacity in a tier higher in input/output performance than the tier designated at the I/O occurrence time.

If the determination at step S3005 is affirmative, the management computer 100 chooses at step S3010 as the migrating destination tier of the page to be processes a tier higher in input/output performance out of tiers having any unoccupied capacity. On the other hand, if the determination at step S3005 is negative, the management computer 100 executes step S3015.

At step S3015, the management computer 100 references the hierarchical storage capacity management table 1107, compares the overall capacity 110703 and the fixed capacity 110705 of each tier at the I/O occurrence time, and calculates the capacities of regions in which the pages of tiers are not fixed. The management computer 100 determines, on the basis of information on the capacity of regions where no tier page is fixed calculated as described above, whether or not there is any page that can be altered in tier placement at the I/O occurrence time from the designated tier to another tier higher in input/output performance than the designated tier.

If the determination at step S3015 is negative, the management computer 100 further executes step S3030. At step S3030, the management computer 100 references the page hierarchical control management table 1106, and identifies in the page No. column 110602 any page No. arranged in a tier having not lower input/output performance than the designated tier. And the management computer 100 compares the IOPS value in the IOPS column 110604 regarding the identified page No. and the IOPS value of the page to be processed, and determines if any page whose IOPS is no higher than the IOPS value of the object of processing is in a tier whose input/output performance is no lower than the designated tier.

If the determination at step S3015 is affirmative or if the determination at step S3030 is affirmative, the management computer 100 at step S3020 identifies a page that makes a vacancy in a superior tier by migrating from a page already arranged in a tier having an input/output performance no lower than the designated tier, namely by migrating from the page already arranged in a tier to a replaceable page, namely an inferior tier, and sets a hierarchical control task regarding the replaceable page. More specifically, the management computer 100 references the page hierarchical control management table 1106, and identifies in the page No. column 110602 pages arranged in a tier having an input/output performance not lower than the designated tier. And the management computer 100 selects out of the identified pages one page whose tier No. in the designated tier column 110605 is not equal to its tier No. in the tier ID column 110603. Next, the management computer 100 generates a page hierarchical control task regarding the chosen page on the basis of migrating the page to a superior tier.

The management computer 100 chooses the tier in which the replaceable page has been arranged as the destination of migrating the page to be processed (step S3025).

If the determination at step S3030 is negative, the management computer 100 determines that the page cannot be migrated to a superior tier, ends processing for migrating the page to an inferior tier and returns to processing shown in FIG. 19.

At step S3040, the management computer 100 calculates the time taken to migrate a page from the tier in which the page to be processed is arranged at the I/O occurrence time (hereinafter referred to as the origin tier) to the destination tier. More specifically, it references the page hierarchical control management table 1106 for the tier in which the page to be processed at the I/O occurrence time. Next, the management computer 100 references the hierarchical storage performance management table 1204 and acquires the Read throughput of the origin tier and the Write throughput of the destination tier. On the basis of these pieces of performance information, the time required for page hierarchical control is calculated according to (time required for page hierarchical control)=Min (the Read throughput of the origin tier and the Write throughput of the destination tier)*(page capacity).

The management computer 100 calculates the execution time of the hierarchical control task by subtracting from the I/O occurrence time the page hierarchical control calculated as described above (step S3045).

At step S3050, the management computer 100 generates the hierarchical control task on the basis of the destination tier and the execution time of the hierarchical control task. More specifically, first the management computer 100 sets the No. of a destination tier for the tier ID column 110603 of the record in the page hierarchical control management table 1106 matching the combination of the I/O occurrence time the page to be processed, sets IOPS information in the page to be processed stored in the I/O analysis data 1103 for the IOPS column 110604, and sets into the designated tier column 110605 the No. of a designated tier for the page to be processed.

Next, the management computer 100 updates the capacity information on the record in the hierarchical storage capacity management table 1107 matching the origin tier and the destination tier of the I/O occurrence time. Namely, a field matching the unoccupied capacity of the origin tier is decreased by an equivalent of the page capacity, and a field matching the unoccupied capacity of the destination tier is increased by an equivalent of the page capacity. A field matching the fixed capacity of the origin tier, if the tier ID set for the origin tier at the I/O occurrence time in the page hierarchical control management table 1106 is the same as the designated tier, is decreased by an equivalent of the page capacity. Further, a field matching the fixed capacity of the destination tier, if the tier ID set for the destination page at the I/O occurrence time in the page hierarchical control management table 1106 is the same as the designated tier, is increased by an equivalent of page capacity. Further, the management computer 100 generates a page hierarchical control task on the basis of information on the task execution time, the I/O occurrence time, the page to be processed and the destination tier, and adds it to the page hierarchical control task management table 1105.

Figure 21:
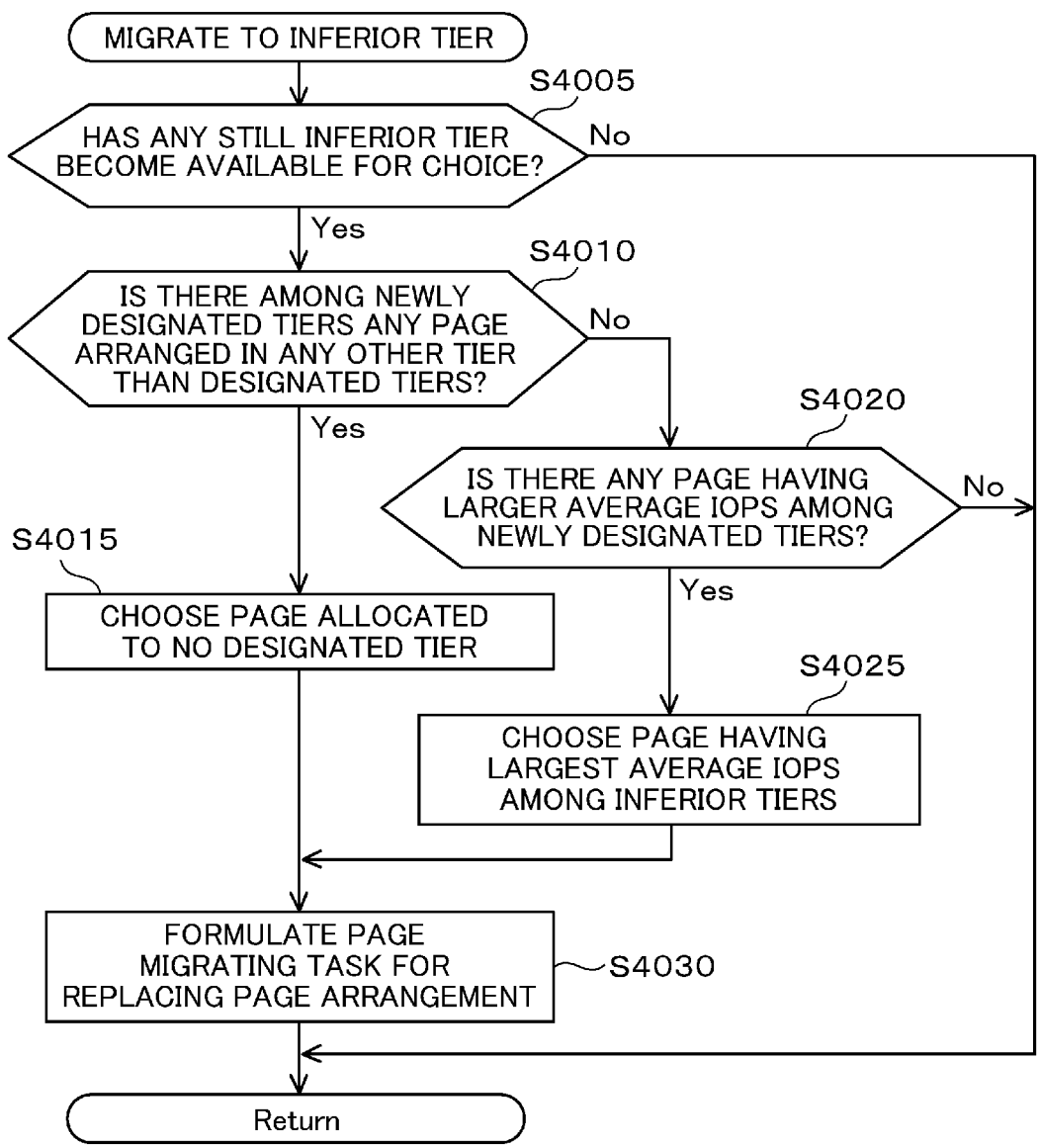
FIG. 21 is a diagram showing an example of flow chart of processing to migrate a page to an inferior tier.

Processing for migrating a page to an inferior tier (step S2060 in FIG. 19) will be described in detail. FIG. 21 shows an example of flow chart of processing to migrate a page to an inferior tier.

The management computer 100 references the I/O analysis data 1103 and acquires the variations over time of the tier No. designated to the page to be processed. Further, the management computer 100 compares the designated tier before and after the I/O occurrence time (step S4005).

If, as a result of comparison, a tier higher in input/output performance than before or the designated tier is unchanged at the I/O occurrence time, the processing for migrating the page to inferior tier is ended, and the sequence returns to the processing shown in FIG. 19. Or if a tier lower in input/output performance than before or no tier is designated tier at the I/O occurrence time, processes at and after step S4010 are executed.

At step S4010, the management computer 100 references the page hierarchical control management table 1106 and acquires from the page No. column 110602 pages arranged in the tier designated to the page to be processed at the I/O occurrence time and higher tiers. Further, the management computer determines whether or not there is any page, among the acquired pages, whose tier No. in the tier ID column 110603 indicates a lower input/output performance than the tier No. of the designated tier column 110605.

If the determination at step S4010 is affirmative, the management computer 100 selects as the replaceable page for the page to be processed one of the pages whose tier No. in the tier ID column 110603 is lower in input/output performance than the tier acquired at S4010 in the designated tier column 110605 (step S4015).

On the other hand, if the determination at step S4010 is negative, at step S4020 the management computer 100 references the page hierarchical control management table 1106 and acquires from the page No. column 110602 page Nos. arranged in the tier designated to the page to be processed at the I/O occurrence time and higher tiers. Further, the management computer determines whether or not there is any page smaller in IOPS value in the IOPS column 110604 than the IOPS value for the page to be processed among the acquired pages.

If the result of determination at step S4020 is affirmative, the management computer. 100 selects as the replaceable page for the page to be processed one of the pages whose IOPS value in the IOPS column 110604 is smaller than the IOPS value for the page to be processed acquired at step S4020 (step S4025).

On the other hand, if the determination at step S4020 is negative, the management computer 100 determines that there is no need to migrate the page to the inferior tier, ends the processing for migrating the page to the inferior tier, and returns to the processing shown in FIG. 19.

At step S4030, the management computer 100 updates the page hierarchical control management table 1106 and the hierarchical storage capacity management table 1107, generates a hierarchical control task to replace the page to be processed with the replaceable page, and adds it to the page hierarchical control task management table 1105. The processing to update the page hierarchical control management table 1106 and the hierarchical storage capacity management table 1107 and the processing to generate the hierarchical control task are the same as at step S3050.

(1-4-3) Details of Actions to Correct I/O Analysis Upon End of Job

Actions of the management computer 100 to correct I/O analysis at the end of a job will be described in detail. The management computer 100, using the event analysis table 1102 stored in the disk 120, generates a task for performing hierarchical control over the storage system 200 on the basis of the hierarchical control plan formulation program 1255.

Figure 22:
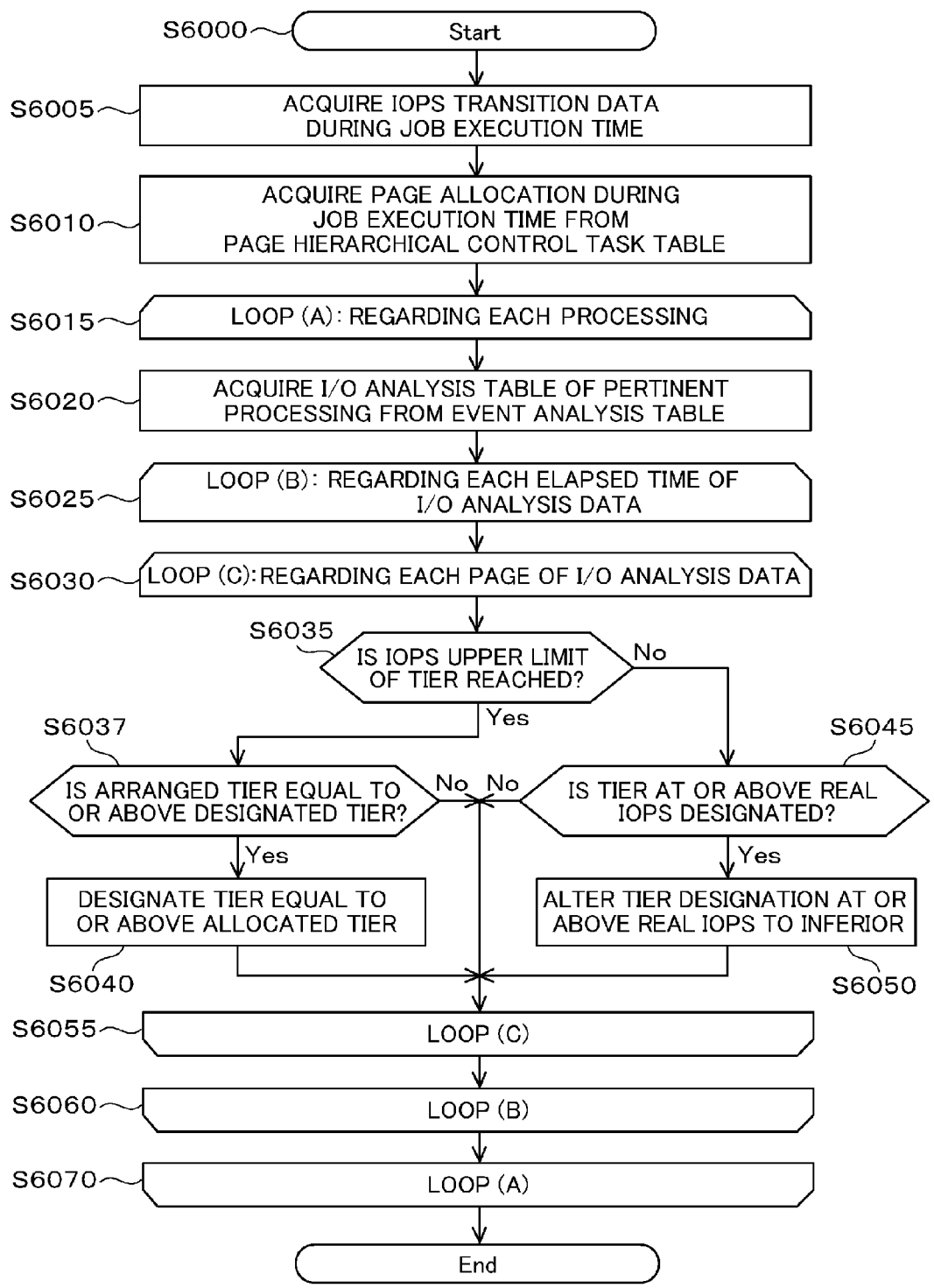
FIG. 22 is a diagram showing an example of flow chart of a job end time I/O analysis correction program.

FIG. 22 shows an example of flow chart of the hierarchical control plan formulation program 1255 in the management computer 100. The management computer 100, upon ending execution of a job stored in the job management table 1104 shown in FIG. 9, executes the hierarchical control plan formulation program 1255 (step S6000). The management computer 100, upon detecting the end of the job, extracts IOPS transitions from the job start time till end time from the IOPS transition data 1201 (step S6005).

The management computer 100 references the page hierarchical control management table 1106 and acquires hierarchical control information from the job start time till end time (step S6010). Then, the management computer 100 identifies from the event analysis table 1102 a record, which is an event matching the ended job, and acquires the subprogram column 110204 of the identified record, the subprogram generation timing column 110205, a list of subprograms 3102 included in the I/O analysis data ID column 110206, and the execution timings and I/O analysis data IDs of those subprograms 3102. Next, the management computer 100 executes on each of the acquired subprograms 3102 step S6020 through step S6060 that follow as the loop (A) once or a plurality of times (step S6015).

At step S6020, the management computer 100 acquires the I/O analysis data 1103 from I/O analysis data IDs matching subprograms 3102 (step S6020). Next, the management computer 100 executes step S6030 through step S6055 that follow as the loop (B) once or a plurality of times on each of the elapsed time steps since the execution of the subprogram 3102 included in the I/O analysis data 1103 acquired at step S6020 (step S6025). Further, the management computer 100 executes on each of the page Nos., which are the objects of processing at the elapsed time step to be processed in the I/O analysis data 1103 acquired at step S6020, step S6035 through step S6050 that follow as the loop (C) once or a plurality of times (step S6030).

At step S6035, the management computer 100 determines whether or not the performance was insufficient in the tier in which the page to be processed was arranged at the time of job execution. More specifically, the management computer 100 calculates time information from the job execution time, the execution timing of the subprogram 3102 acquired at step S6015 from the event analysis table 1102 and the elapsed time since the execution of the subprogram 3102 acquired at step S6025 from the I/O analysis data 1103. Next, the management computer 100 acquires, at the time calculated as described above, from the IOPS transition data generated at step 6005 the IOPS value generated with respect to the page to be processed. Similarly, the management computer 100 acquires, at the time calculated as described above, from the hierarchical control information acquired at step 6010 the tier in which the page to be processed was arranged. Next, the management computer 100 references the hierarchical storage performance management table 1204 and acquires the IOPS upper limit of the tier in which the page to be processed was arranged. Then, the management computer 100 compares IOPS value generated with respect to the page to be processed and the IOPS upper limit of the tier in which the page to be processed was arranged, and determines whether or not the IOPS generated with respect to the page to be processed at the time of job execution was at its upper limit (step S6035).

If the result of determination at step S6035 is affirmative, the management computer 100 determines whether or not the tier in which the page to be processed was arranged is a tier higher in input/output performance than in the tier designated by the I/O analysis data 1103 (step S6037).

If the result of determination at step S6037 is affirmative, the management computer 100 alters information on the tier set to the field of the designated tier matching the page designated at step S6030, out of the elapsed times in the I/O analysis data 1103 designated at step S6025, to a superior tier (step S6040). If the result of determination at step S6037 is negative, the management computer 100 performs processes at and after step S6055.

If the result of determination at step S6035 is negative, the management computer 100 determines whether or not the page to be processed was allocated at the time of job execution to a tier having a higher than required performance level. More specifically, the management computer 100 compares the IOPS value generated on the page to be processed at step 6035 and IOPS upper limit information on each tier in the hierarchical storage performance management table 1204, and determines whether or not the upper limit value of a tier not lower than the actually arranged tier is higher than the IOPS value generated for the page to be processed (step S6045).

If the result of determination at step S6045 is affirmative, the management computer 100 determines that the page to be processed was allocated at the time of job execution to a tier having a higher than required performance level, and alters tier information set in the field reference at step S6045 in the designated tier to an inferior tier. If the result of determination at step S6045 is negative, the management computer 100 performs the processes at and after step S6055.

At step S6055, the management computer 100 determines whether or not processing is executed on every page covered by the loop (C). If processing is executed, the management computer 100 executes step S6060 or, if not, the management computer 100 returns processing to step S6030. At step S6060, the management computer 100 determines whether or not processing is executed on every elapsed time step covered by the loop (B). If processing is executed, the management computer 100 executes step S6070 or, if not, the management computer 100 returns processing to step S6025. At step S6070, the management computer 100 determines whether or not processing is executed on every subprogram 3102 covered by the loop (A). If processing is executed, the management computer 100 ends the hierarchical control plan formulation program 1255 or, if not, the management computer 100 returns processing to step S6015.

To add, in the foregoing description, determination on correction of the hierarchical control plan was based on performance information (IOPS) regarding the storage system 200 and the IOPS upper limit of tiers, but this is just one example of correcting the hierarchical control plan, and the information to be utilized in correcting the hierarchical control plan is not limited to performance information regarding the hierarchical storage (IOPS) and the IOPS upper limit of tiers. For instance, response performance information on the application program 3101 of the host computer 300 and required performance set in the application program 3101 may be used instead.

As hitherto described, it is possible to migrate pages with a large amount of access to subprograms 3102 to a superior tier before executing the subprograms 3102, and response performance to application programs can be thereby improved. It is also possible to migrate pages with a small amount of access to subprograms 3102 to an inferior tier, and occupation of superior tiers by pages with a small amount of access can be thereby prevented.

Second Embodiment (2-1) Outline of this Embodiment

Regarding the computer system of the Second Embodiment, the following description will cover only those parts different from the First Embodiment. For the First Embodiment, it was presupposed that the relevance between subprograms 3102 and pages constituting the application program 3101 could be set in advance in the subprogram page relationship table 1101 stored in the disk 120 of the management computer 100. However, in the Second Embodiment, the I/O analysis program 1254 can be applied also to an application program 3101 in which this relevance cannot be set in advance. More specifically, the management computer identifies pages relevant to the subprogram 3102 in accordance with a subprogram page relevance discovering program, and updates the subprogram page relationship table 1101.

(2-2) Hardware Configuration of Computer System

Figure 23:
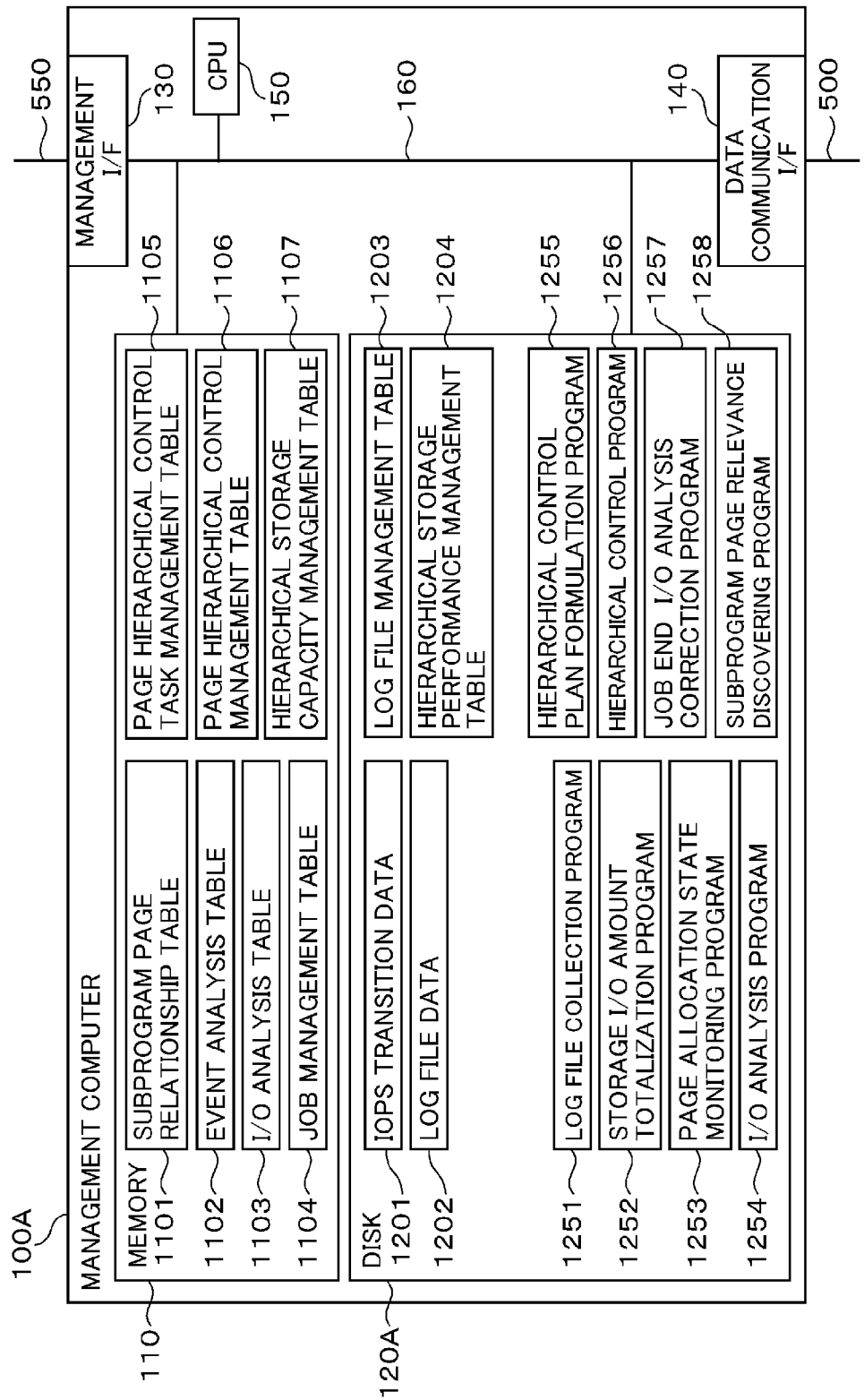
FIG. 23 is a diagram showing an example of configuration of a management computer in a Second Embodiment.

The computer system of the Second Embodiment is configured of a management computer 100A, a storage system 200 and a host computer 300, and they are connected to one another via a communication network 500 and a communication network 550. Herein, the storage system 200 and the host computer 300 are the same as their respective counterparts in FIG. 2. FIG. 23 shows an example of configuration of the management computer 100A in the Second Embodiment, and a disk 120A besides storing of programs and tables developed in the disk 120A by the management computer 100 shown in FIG. 3, further stores a subprogram page relevance discovering program 1258.

(2-3) Details of Actions to Discover Subprogram Page Relevance

Figure 24:
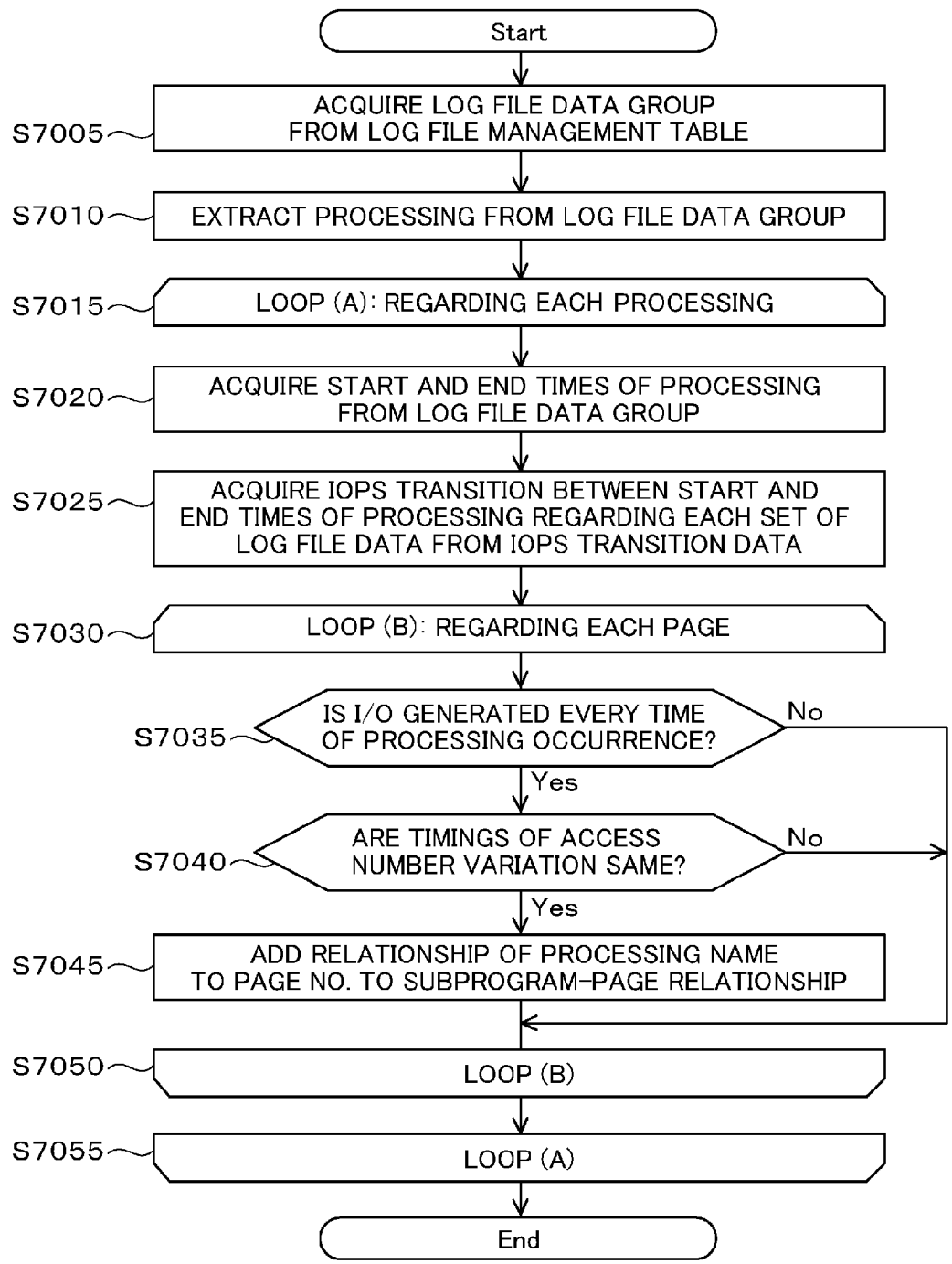
FIG. 24 is a diagram showing an example of subprogram page relevance discovering program flow chart of the Second Embodiment.

Actions of a subprogram page relevance discovering program stored in the disk 120A by the management computer 100A will be described in detail. FIG. 24 is a diagram showing an example of flow chart of the subprogram page relevance discovering program 1258. The management computer 100A executes, periodically and for each set of event information (combination of sets of information shown in the application name column 120301, the operation type column 120302 and the server name column 120303) the included in the log file management table 1203, the subprogram page relevance discovering program 1258 with event information as the input.

The CPU 150 of the management computer 100A (hereinafter abbreviated to the management computer 100A) first acquires every log file IO matching inputted event information from the log file IO column 120305, and identifies the log file data 1202 matching the acquired log file 10 (step S7005). Next, the management computer 100A extracts one or more subprograms 3102 from the identified log file data group 1202 (step S7010). As the processing at step S7010 is the same as that at step S1010, its description is dispensed with.

The management computer 100A executes step S7020 through step S7050 that follow as the loop (A) once or a plurality of times for each of the subprograms 3102 extracted at step S7010 (step S7015). At step S7020, the management computer 100A extracts time information matching the information regarding the subprogram 3102 chosen at step S7015 from the subprogram column 120203 and the time column 120202 in the log file data group 1202 identified at step S7005. More specifically, the time information indicates the start time and end time of the subprogram 3102.

The management computer 100A extracts from IOPS transition data 1103 IOPS transitions in the time group extracted at step S7020. More specifically, they are IOPS transitions from the start time till end time of the subprogram 3102. To add, if the end time of the subprogram 3102 is not identified at step S7020, they are IOPS transitions until the end time stored in the log file data 1202 (step S7025).

The management computer 100A executes processes at step S7035 through step S7045 that follow as the loop (B) once or a plurality of times for each page (step S7030). The management computer 100A determines at step S7035 whether or not an access to the page chosen at step S7030 occurs every time after the subprogram 3102 is executed. More specifically, it determines whether or not a failure of any IOPS for a page to surpass a threshold occurs in the IOPS transition group extracted at step S7025 (step S7035). To add, as the threshold, the IOPS value or the like for the pertinent page in state of occurrence of no event at all may be used for instance.

If, as a result of determination at step S7035, it is found that an access to a page has occurred in every set of IOPS transition data, the management computer 100A executes step S7040. The management computer 100A determines at step S7040 whether or not the timing of variation of access volume occurring to any page chosen at step S7030 is constant. More specifically, the management computer 100A calculates, for every IOPS transition group extracted at step S7025, the elapsed time since the execution of the subprogram 3102 until the amount of access to the page. The method of calculation may be, for instance, similar processing to that executed at S1020. Next, the management computer 100A determines for each IOPS transition group whether or not there is any discrepancy in the calculated elapsed time since the execution of the subprogram 3102 until the amount of access to page to which the calculation above applies (step S7040). As the method of checking any discrepancy in the elapsed time, for instance a statistical checking method utilized at step S1010 may be used.

If the result of determination at step S7040 is affirmative, the management computer 100A executes step S7045 or, if negative, the management computer 100A executes step S7050. At step S7045, the management computer 100A stores into the subprogram page relationship table 1101 information on the event given as an input, the subprogram 3102 chosen at step S7015 and the No. of the page chosen at step S7030. To add, information indicating an unoccupied column is stored into the data ID column 110105 of the subprogram page relationship table 1101.

At step S7050, the management computer 100A determines whether or not processing is executed on every page covered by the loop (B). If processing is found to be executed, the management computer 100A executes step S7055 or, if not, the management computer 100A returns processing to step S7030. At step S7055, the management computer 100 determines whether or not processing is executed on every subprogram 3102 covered by the loop (A). If processing is found to be executed, the management computer 100A ends the job end time I/O analysis correction program 1257, or if not, the management computer 100A returns processing to step S7030.

As hitherto described, even in an application program 3101 in which relevance between the subprogram 3102 and pages is not clear, I/O analysis can be performed by identifying pages relevant to the subprogram 3102 and updating the subprogram page relationship table 1101 in accordance with the subprogram page relevance discovering program 1258.

Third Embodiment (3-1) Outline of this Embodiment

Concerning the computer system of the Third Embodiment, only the parts different from the First Embodiment will be described in the following account. In the First Embodiment, data to be used by the application program 3101 is arranged in the storage system 200. Unlike that, in the Third Embodiment, even in the disk within the host computer, it is made possible to arrange data to be used by the application program 3101, and page hierarchical control can be accomplished on the basis of I/O analysis at the time of performing operations on the application program 3101.

(3-2) Hardware Configuration of Computer System

Figure 25:
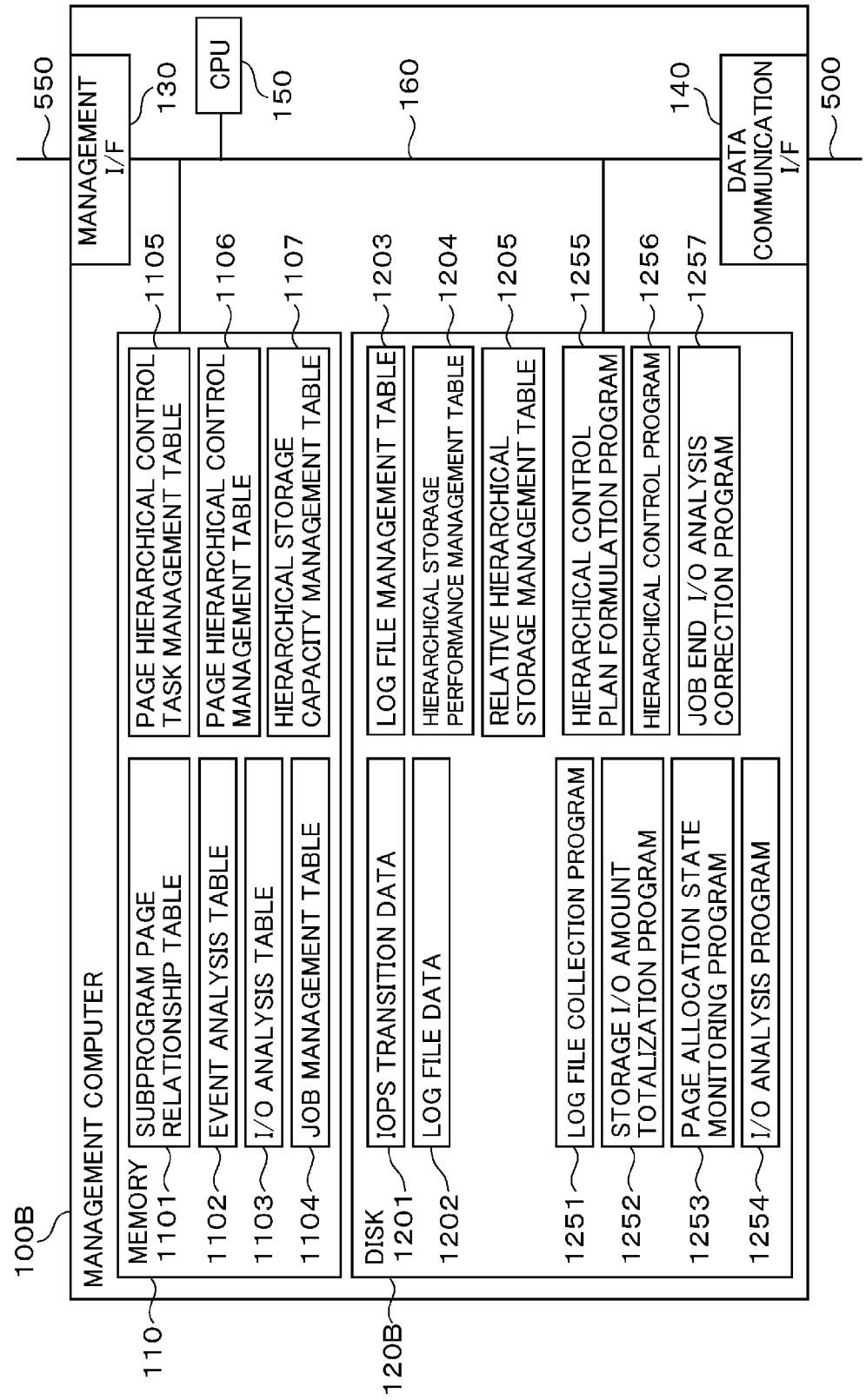
FIG. 25 is a diagram showing an example of configuration of a management computer in a Third Embodiment.

The computer system of the Third Embodiment is configured of a management computer 100B, a storage system 200 and a host computer 300B, and they are connected to one another via a communication network 500 and a communication network 550. Here, the storage system 200 is the same as what is shown in FIG. 4. FIG. 25 is a diagram showing an example of configuration of the management computer 100B in the Third Embodiment. A disk 120B of the management computer 100B stores the programs and tables developed in the disk 120 by the management computer 100 shown in FIG. 3, and a relative hierarchical storage management table 1205 is further held in the disk 120B. As programs and tables stored in the memory 110, the I/F for management use 130, the data communication I/F 140, the CPU 150 and the memory 110 of the management computer 100B pertaining to the Third Embodiment are similar to the configuration of the management computer 100 pertaining to the First Embodiment, their description will be dispensed with.

The disk 320 of the host computer 300B stores the programs and tables the host computer 300 shown in FIG. 5 develops in the disk 320, and the storage system 200 shown in FIG. 4 further holds in the disk 320 programs similar to the I/O amount monitoring program 2151 and the page allocation control program 2152 stored in a memory 210.

To add, in the computer system of the Third Embodiment, part or the whole of the data to be used by application programs the storage system 200 shown in FIG. 4 stores in a storage region 250 can be stored not only in the storage region 250 of the storage system 200 but also in the disk 320 or stored in an external storage DAS (Direct Attached Storage), not shown, connected to the host computer 300B. Namely, the presence of the storage system 200 is not indispensable in the Third Embodiment. Further, in the computer system of the Third Embodiment, data may be reciprocally stored in two or more host computers 300B.

As programs and tables stored in the memory 310, the I/F for management use 330, the data communication I/F 340, the CPU 350 and the memory 310 of the host computer 300B of the Third Embodiment are similar to the configuration of the host computer 300 shown in FIG. 5, their description is dispensed with.

(3-3) Details of Various Tables

FIG. 26 is a diagram showing an example of relative hierarchical storage management table 1205 stored in the disk 120B of the management computer 100B. The relative hierarchical storage management table 1205 is information resulting from sequential arrangement of tiers held by the storage system 200 and the host computer 300B in the order of input/output performance levels when data is accessed from the host computer 300B.

In a server name column external storage, the name of the host computer 300B by which the application program 3101 is executed is stored. In a relative tier ID column 120502, the Nos. of tiers which constitute a storage region accessible from the host computer 300B that executes the application program 3101 are stored. In the relative tier ID column 120502, the higher the tier input/output performance level as seen from the host computer 300B that executes the application program 3101, the smaller the No. that is assigned. In a tier-providing machine name column 120503, the name of the storage system 200 or the host computer 300B that actually holds tiers is stored.

In a tier ID column 120504, the tier No. of the storage system 200 or the host computer 300B that actually holds tiers is stored. Further, in contrast to relative tiers whose Nos. are determined by the input/output performance level as seen from the host computer 300B that executes the application program 3101, tiers numbered by the tier ID 120504 within the storage system 200 or the host computer 300B are expressed as absolute tiers. To add, though it was stated that in FIG. 26 the smaller the tier No. the higher the performance level, this is not the only possibility. Further, instead of the tier No., the name of the medium constituting the tier can also be used as the tier ID.

(3-4) Details of Actions of Various Devices

When the management computer 100B is to reference a tier No. in a program stored in the disk 120B, the tier No. in the relative tier ID column 120502 of the relative hierarchical storage management table 1205 is searched for. Further, when the management computer 100B is to formulate a hierarchical control plan, a hierarchical control task is generated by differentiating absolute tiers from relative tiers on the basis of the relative hierarchical storage management table 1205 and designating absolute tiers.

As hitherto described, the management computer 100B can formulate a hierarchical control plan among all the tiers provided by the storage system 200 and the host computer 300B on the basis of the result of I/O analysis and execute the plan. Further in a computer system in which no dedicated storage system is present, namely having a built-in server or configured only of external storages, it is possible to formulate and execute a hierarchical control plan.

LIST OF REFERENCE SIGNS

100 . . . Management computer
200 . . . Storage system
300 . . . Host computer:
1101 . . . Subprogram relationship table
1201 . . . IOPS transition data
3201 . . . Log file

The invention claimed is:

1. A method for controlling hierarchical storage executed by a control unit of a computer system having a plurality of storage tiers differing in accessing performance, an application program executed by a processing unit of the computer system having a specific process to access a storage region within the storage tiers,
the method including:
a first step of storing first information on matching between the specific process and the storage region;
a second step of acquiring second information on access actions of the specific process over time;
a third step of acquiring third information on an amount of access to the storage region over time; and
a fourth step of identifying a time of variation of the amount of access from the second information and the third information on the basis of the first information, determining a migration start time and migrating data in the storage region among the storage tiers according to the time of variation of the amount of access.

2. The method for controlling hierarchical storage according to claim 1, including the fourth step by which, when the variation of the amount of access is an increase in the amount of access, the migration start time is so determined so as to migrate the data in the storage region from a storage tier lower in access performance level to a storage tier higher in access performance level before the time of increase in the amount of access.

3. The method for controlling hierarchical storage according to claim 2, including the fourth step by which the migration start time is determined by subtracting the migration time of data in the storage region from the time of increase in the amount of access.

4. The method for controlling hierarchical storage according to claim 1, including the fourth step by which, when the variation of the amount of access is a decrease in the amount of access, the migration start time is so determined so as to migrate the data in the storage region from a storage tier higher in access performance level to a storage tier lower in access performance level at the time of decrease in the amount of access.

5. The method for controlling hierarchical storage according to claim 1, including the first step of acquiring the second information and the third information, associating the specific process and the storage region with each other on the basis of the acquired the acquired second information and third information to generate the first information, and storing the generated first information.

6. The method for controlling hierarchical storage according to claim 1, including the second step of acquiring second information on the start of access over time of the specific process having a temporal relationship to operations on the application program.

7. The method for controlling hierarchical storage according to claim 6, including the fourth step of identifying the time of variation of the amount of access relative to the time of the operations from the second information and the third information on the basis of the first information, determining the migration start time with reference to the time of the operations according to the time of variation of the amount of access and migrating the data in the storage region among the storage tiers.

8. A computer system including a plurality of storage devices, a host computer and a management computer,
wherein the storage devices providing a plurality of storage tiers differing in access performance level;
the host computer executes an application program including a specific process to access a storage region in the storage tiers;
the management computer is programmed to:
store first information on matching between the specific process and the storage region;
acquire from the host computer second information on actions of accesses over time in the specific process;
acquire from the storage third information on an amount of access over time in the storage region; and
identify a time of variation of the amount of access from the second information and the third information on the basis of the first information, determine a migration start time according to the time of variation of the amount of access and migrate data in the storage region among the storage tiers in the storage devices.

9. The computer system according to claim 8,
wherein the management computer is further programmed to:
when the variation of the amount of access is an increase in the amount of access, determine the migration start time and migrate the data in the storage region from a storage tier lower in access performance level to a storage tier higher in access performance level in the storage devices before the time of increase in the amount of access.

10. The computer system according to claim 8,
wherein the host computer includes the storage devices, and
wherein the management computer is further programmed to:
acquire the third information from the host computer, and
identify the time of variation of the amount of access from the second information and the third information on the basis of the first information, determine the migration start time according to the time of variation of the amount of access and migrate the data in the storage region among the storage tiers in the host computer.

11. The computer system according to claim 8,
wherein the storage devices includes a first storage tier,
wherein the host computer includes a second storage tier, and
wherein the management computer is further programmed to:
acquire the third information from the host computer and the storage, and
identify the time of variation of the amount of access from the second information and the third information on the basis of the first information, determine the migration start time according to the time of variation of the amount of access and migrate the data in the storage region among the storage tiers in the storage devices and/or the host computer.

* * * * *